US010762606B2

(12) United States Patent
Tate et al.

(10) Patent No.: US 10,762,606 B2
(45) Date of Patent: Sep. 1, 2020

(54) IMAGE PROCESSING APPARATUS AND METHOD FOR GENERATING HIGH QUALITY IMAGE

(71) Applicant: CANON KABUSHIKI KAISHA, Tokyo (JP)

(72) Inventors: Shunta Tate, Tokyo (JP); Masakazu Matsugu, Yokohama (JP); Yasuhiro Komori, Tokyo (JP); Yusuke Mitarai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

(21) Appl. No.: 15/816,678

(22) Filed: Nov. 17, 2017

(65) Prior Publication Data

US 2018/0144447 A1 May 24, 2018

(30) Foreign Application Priority Data

Nov. 24, 2016 (JP) ................................ 2016-228042

(51) Int. Cl.
*G06T 5/00* (2006.01)
*G06T 5/50* (2006.01)
*G06T 15/20* (2011.01)

(52) U.S. Cl.
CPC .............. *G06T 5/003* (2013.01); *G06T 5/001* (2013.01); *G06T 5/50* (2013.01); *G06T 15/205* (2013.01); *G06T 2207/10024* (2013.01); *G06T 2207/10028* (2013.01); *G06T 2207/10048* (2013.01); *G06T 2207/20081* (2013.01); *G06T 2207/20084* (2013.01); *G06T 2207/20216* (2013.01)

(58) Field of Classification Search
CPC ......... G06T 15/205; G06T 2207/10028; G06T 2207/10048; G06T 2207/20081; G06T 2207/20084; G06T 2207/20216; G06T 5/003; G06T 5/50
See application file for complete search history.

(56) References Cited

U.S. PATENT DOCUMENTS

2005/0069207 A1* 3/2005 Zakrzewski ....... B64D 45/0015
382/190
2006/0018566 A1* 1/2006 Coleman .............. G06K 9/0063
382/312

FOREIGN PATENT DOCUMENTS

JP 4942221 B2 5/2012

OTHER PUBLICATIONS

Jure Zbontar; Computing the Stereo Matching Cost with a Convolutional Neural Network.
Qiong Yan; Cross-Field Joint Image Restoration via Scale Map; The Chinese University of Hong Kong.
(Continued)

*Primary Examiner* — Manuchehr Rahmjoo
(74) *Attorney, Agent, or Firm* — Canon U.S.A., Inc. IP Division

(57) ABSTRACT

An image processing apparatus includes: an acquisition unit configured to acquire a plurality of images each capturing an identical target and having a different attribute; a derivation unit configured to derive features from the plurality of images, using a first neural network; an integration unit configured to integrate the features derived from the plurality of images; and a generation unit configured to generate a higher quality image than the plurality of images from the feature integrated by the integration unit, using a second neural network.

6 Claims, 30 Drawing Sheets

(56) References Cited

OTHER PUBLICATIONS

Dengyu Liu; Efficient Space-Time Sampling with Pixel-wise Coded Exposure for High Speed Imaging; IEEE Transactions on Pattern Analysis and Machine Intelligence pp. 1-14.

Anat Levin; Image and Depth from a Conventional Camera with a Coded Aperture; Massachusetts Institute of Technology, Computer Science and Artificial Intelligence Laboratory.

Chao Dong; Learning a Deep Convolutional Network for Image Super-Resolution; Department of Information Engineering, The Chinese University of Hong Kong Microsoft Research pp. 1-16.

Alexey Dosovitskiy; Learning to Generate Chairs with Convolutional Neural Networks; Department of Computer Science, University of Freiburg; pp. 1539-1546.

* cited by examiner

FIG. 11A
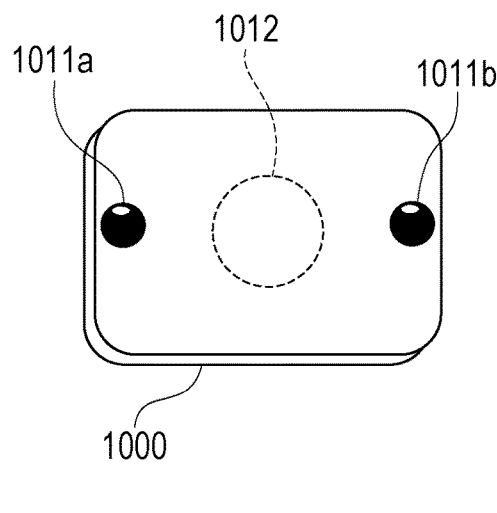
FIG. 11B
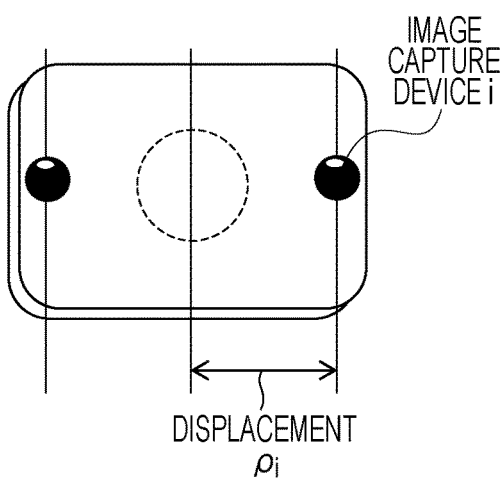
FIG. 11C
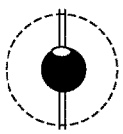
(1) $\alpha=0.0$
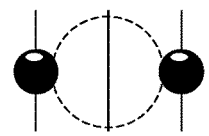
(2) $\alpha=0.5$
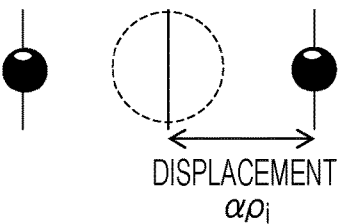
(3) $\alpha=1.0$

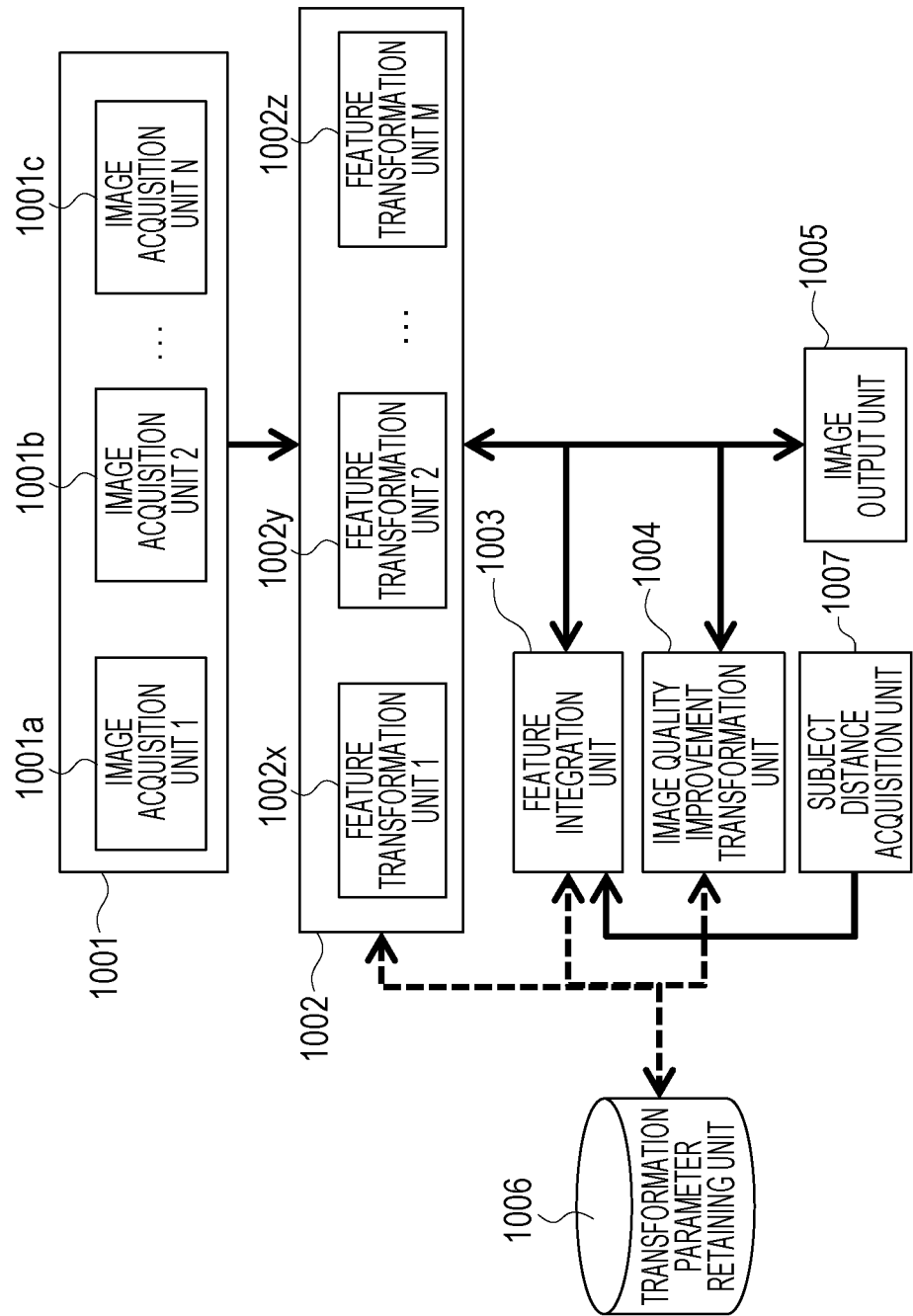

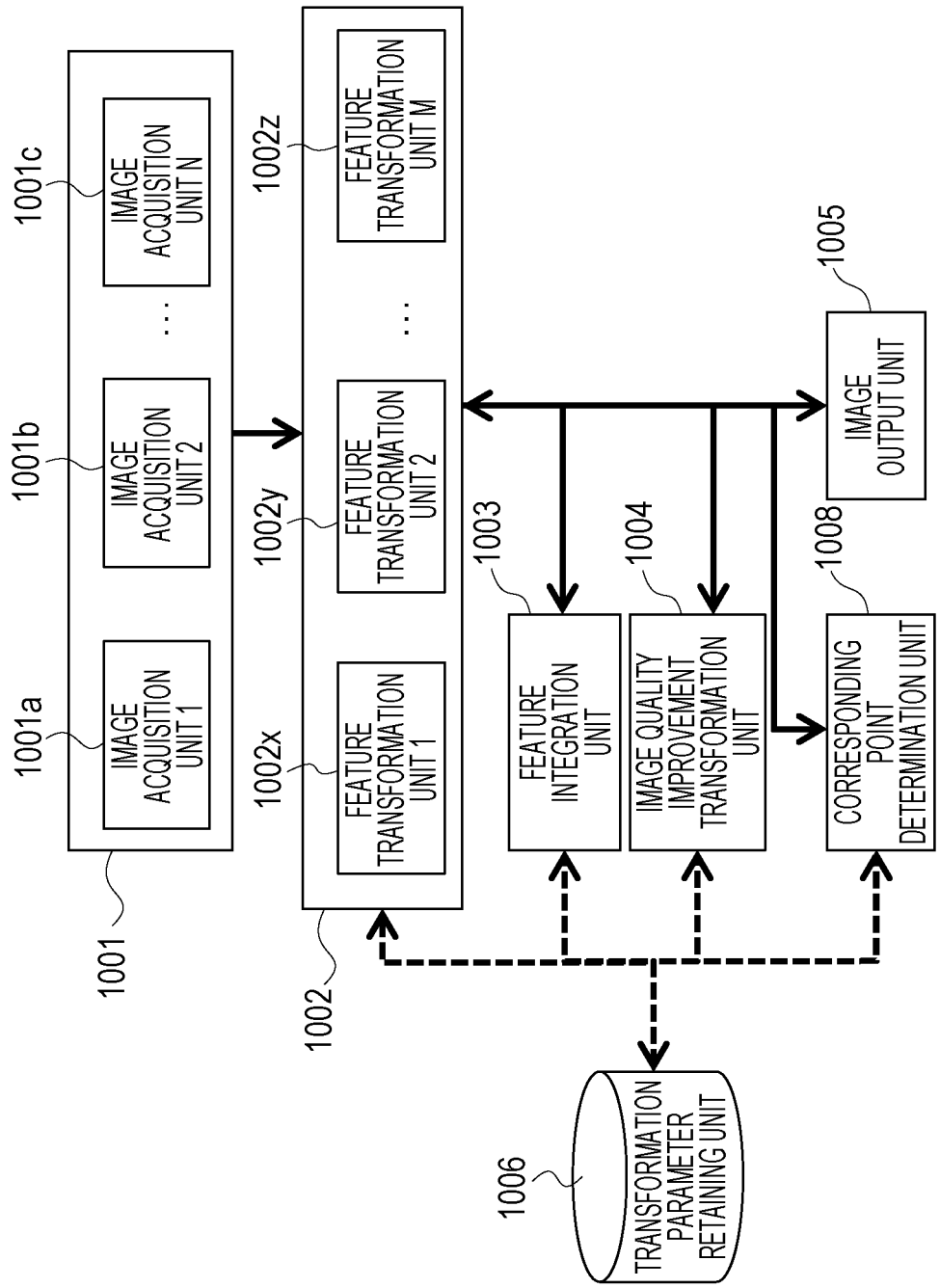

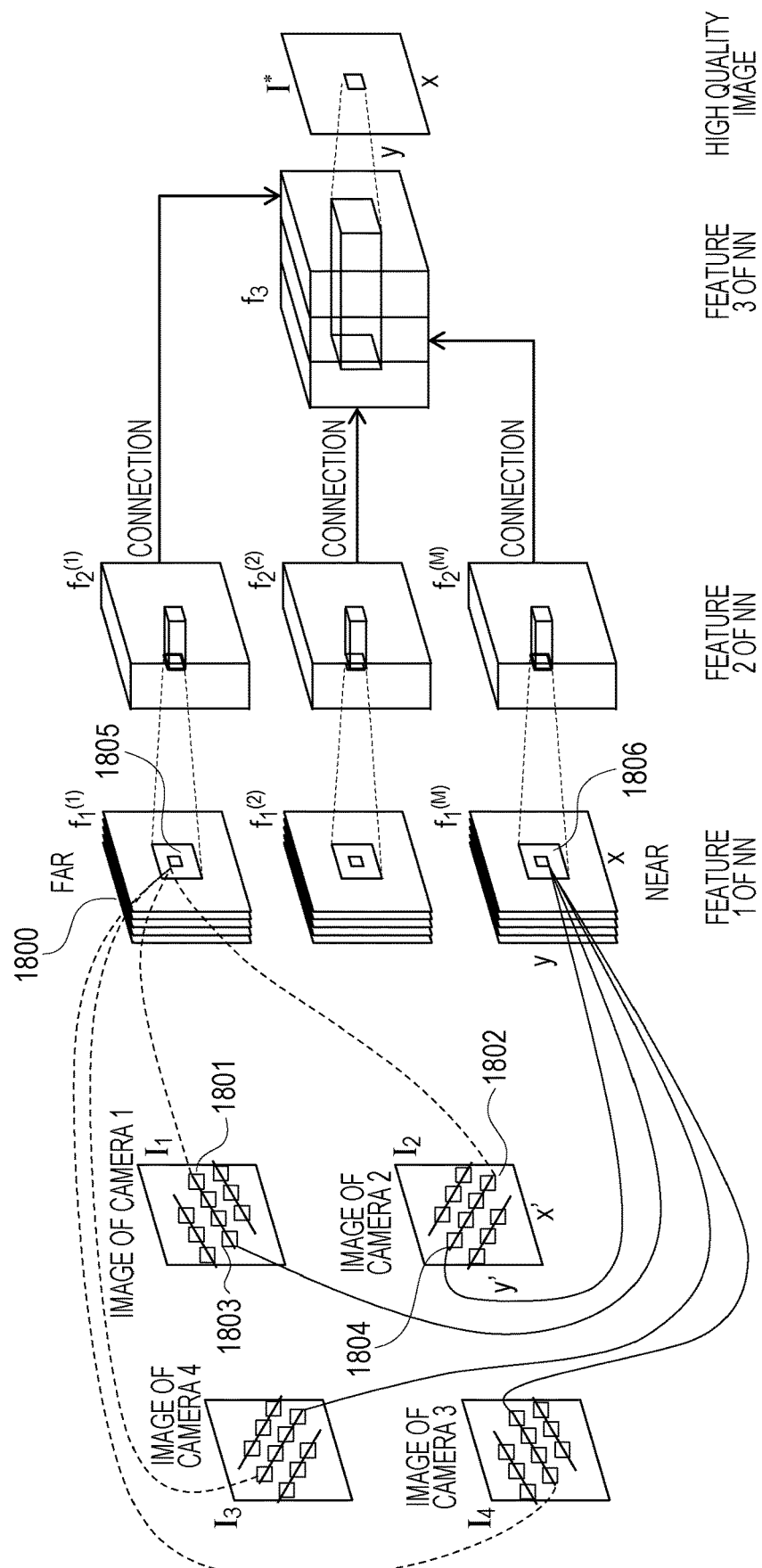

EXAMPLES OF
CALIBRATION BOARDS

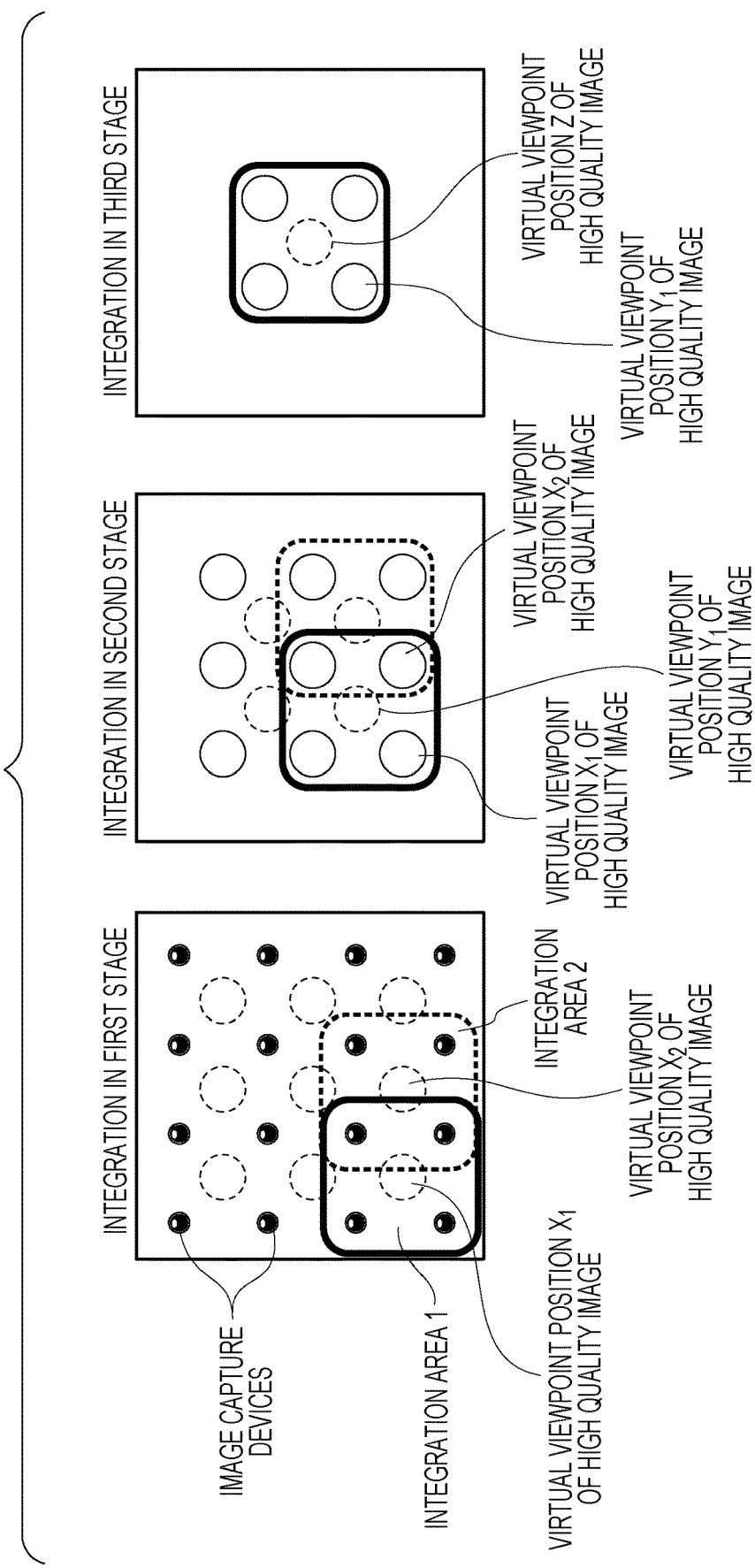

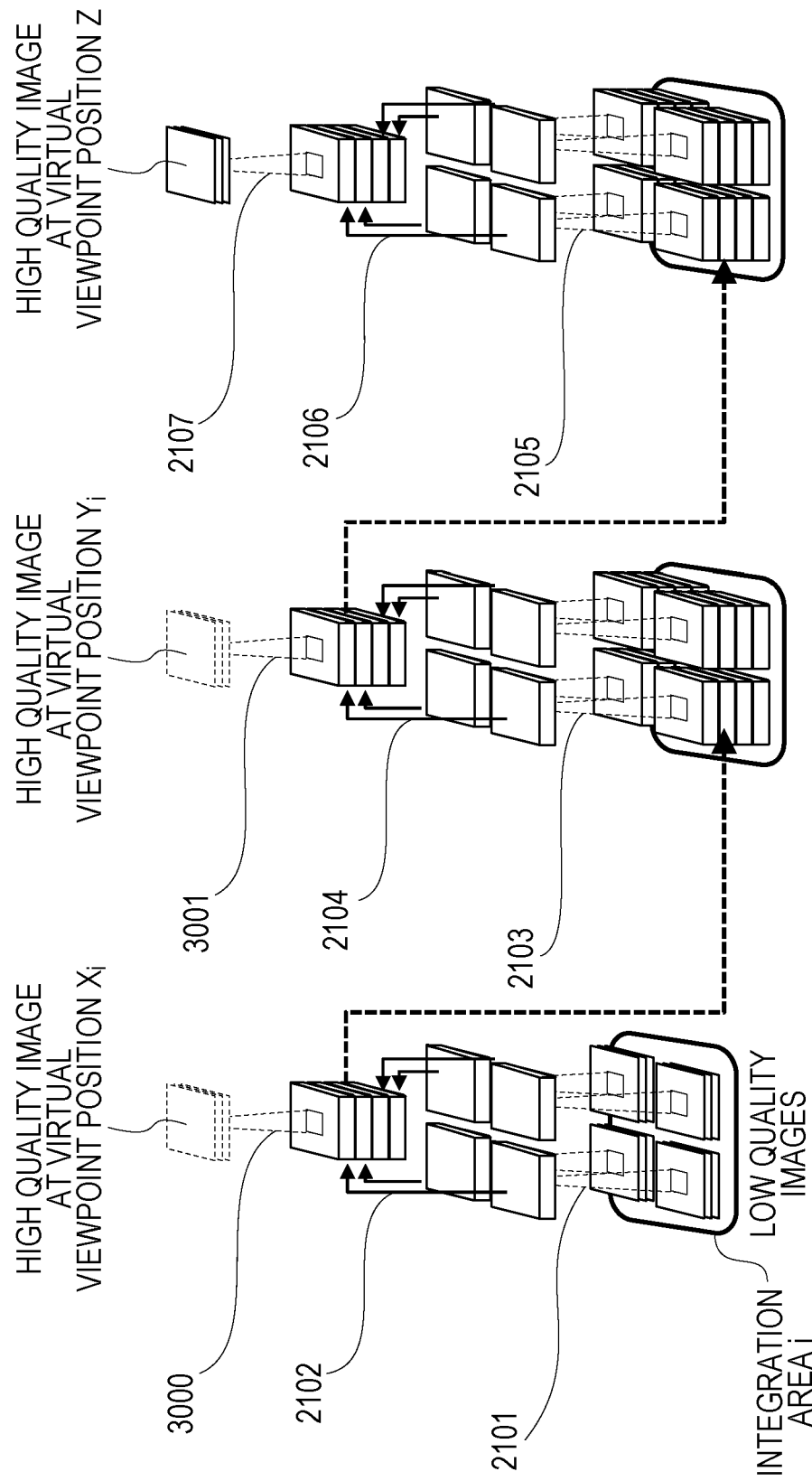

IMAGE PROCESSING APPARATUS AND METHOD FOR GENERATING HIGH QUALITY IMAGE

BACKGROUND

Field of the Disclosure

The present disclosure relates to an image processing apparatus and method for generating a high quality image.

Description of the Related Art

There is a technique for generating a high quality image from a plurality of images such as described in Japanese Patent No. 4942221. In the known technique, images from multiple viewpoints undergo a projective transformation, one by one, in such a manner as to cause the images to agree with an image from a virtual viewpoint, and the superimposed images are averaged to obtain a high quality image.

The known method requires to distort the images with appropriate projective transformation parameters in such a manner that the images are superimposed substantially at the pixel level. Moreover, if a subject has depth, it is required to distort the images according to the areas, considering parallax. Moreover, in the known method, improvement in image quality is based on the image averaging process; therefore, it is difficult to improve a cause of systematic degradation common among the images, such as chromatic aberration and spherical aberration.

SUMMARY

An image processing apparatus includes: an acquisition unit configured to acquire a plurality of images each capturing an identical target and having a different attribute; a derivation unit configured to derive features from the plurality of images, using a first neural network; an integration unit configured to integrate the features derived from the plurality of images; and a generation unit configured to generate a higher quality image than the plurality of images from the feature integrated by the integration unit, using a second neural network.

Further features of the present disclosure will become apparent from the following description of exemplary embodiments (with reference to the attached drawings).

BRIEF DESCRIPTION OF THE DRAWINGS

FIGS. 11A to 11C are diagrams illustrating examples of an image capture unit according to one or more aspects of the present disclosure.

FIGS. 13A and 13B are diagrams illustrating examples of the functional configuration of an image processing apparatus according to one or more aspects of the present disclosure.

FIGS. 18A and 18B are schematic diagrams of neural networks according to one or more aspects of the present disclosure.

FIGS. 21A and 21B are diagrams illustrating examples of learning in stages according to one or more aspects of the present disclosure.

DESCRIPTION OF THE EMBODIMENTS

Embodiments of the present disclosure are described hereinafter with reference to the drawings.

Figure 1:
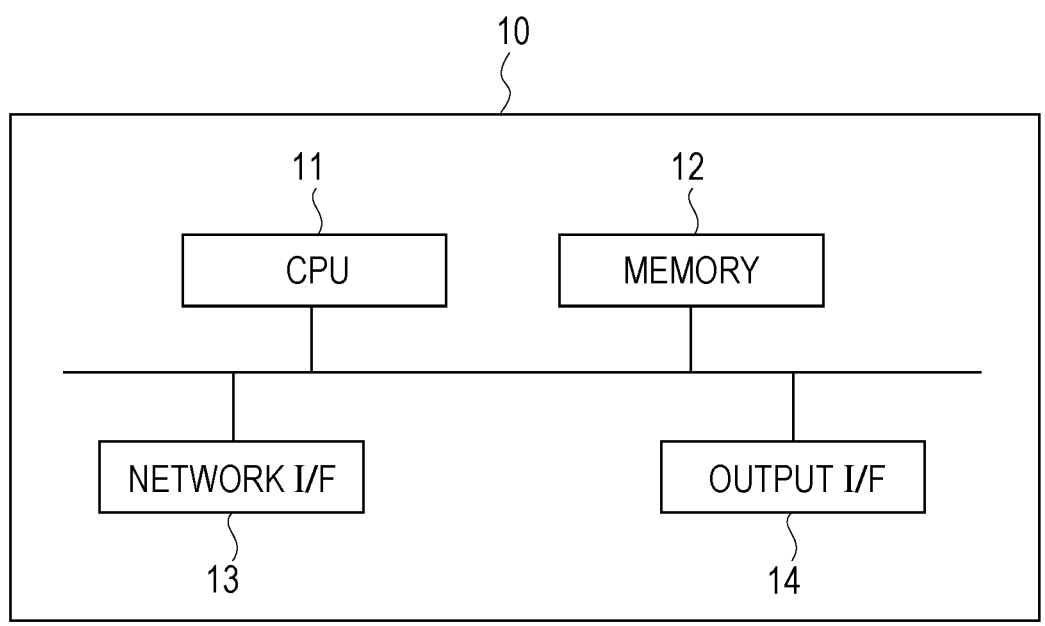
FIG. 1 is a diagram illustrating an example of the hardware configuration of an image processing apparatus according to one or more aspects of the present disclosure.

FIG. 1 is a diagram illustrating an example of the hardware configuration of an image processing apparatus 10. The image processing apparatus 10 includes a CPU 11, a memory 12, a network I/F 13, and an output I/F 14 as a hardware configuration. The CPU 11 controls the entire image processing apparatus 10. The memory 12 stores images, a program, data that is used when the CPU 11 executes processes, and the like. The network I/F 13 is an interface that connects the image processing apparatus 10 to a network in a wired or wireless manner. The output I/F 14 is connected to, for example, a display, and outputs process results of the CPU 11, and the like to the display and the like.

The hardware configuration illustrated in FIG. 1 is an example. The image processing apparatus 10 may include a plurality of CPUs, an output unit itself such as a display, interfaces with an image capture unit, an operating unit, and the like, and the image capture unit itself and the operating unit itself.

The CPU 11 executes processes based on the program stored in the memory 12 to achieve the functional configurations of the image processing apparatus 10, the functional configurations being illustrated in FIGS. 2, 7, 13A, and 13B, and processes of flowcharts of FIGS. 5, 8, 12, 15A, 15B, 15C, and 22, which are described below.

First Embodiment

The purpose of the image processing apparatus 10 of the first embodiment is to generate a high quality image that can be obtained by an image capture device with a highly accurate configuration, from a plurality of low quality images of an image capture device with a simple configuration (hereinafter also referred to as the low quality image capture device). Resolution enhancement, noise reduction, color correction, sharpening, a change in the depth of field, and the like are conceivable for improvement in image quality. However, improvement in image quality is assumed to indicate resolution enhancement in the embodiment.

In the embodiment, low quality images are assumed to be different in image attribute such as a color image, an infrared image, an image captured with a flash. The viewpoint positions of the low quality images and the high quality image generated are assumed to be the same. A plurality of images with different attributes from the agreed viewpoint is obtained here by the following method: (1) A ray of light is split in the low quality image capture device, using a half mirror, and (2) Light-sensitive elements with different attributes are mixed and arranged in an image capture device. The low quality images acquired by the image processing apparatus 10 are assumed to be those captured by the low quality image capture device designed as described above.

The image processing apparatus 10 according to the embodiment is described with reference to the drawings. Those having the same reference numerals throughout the drawings are assumed to perform the same operations, and their repeated descriptions are omitted.

Figure 2:
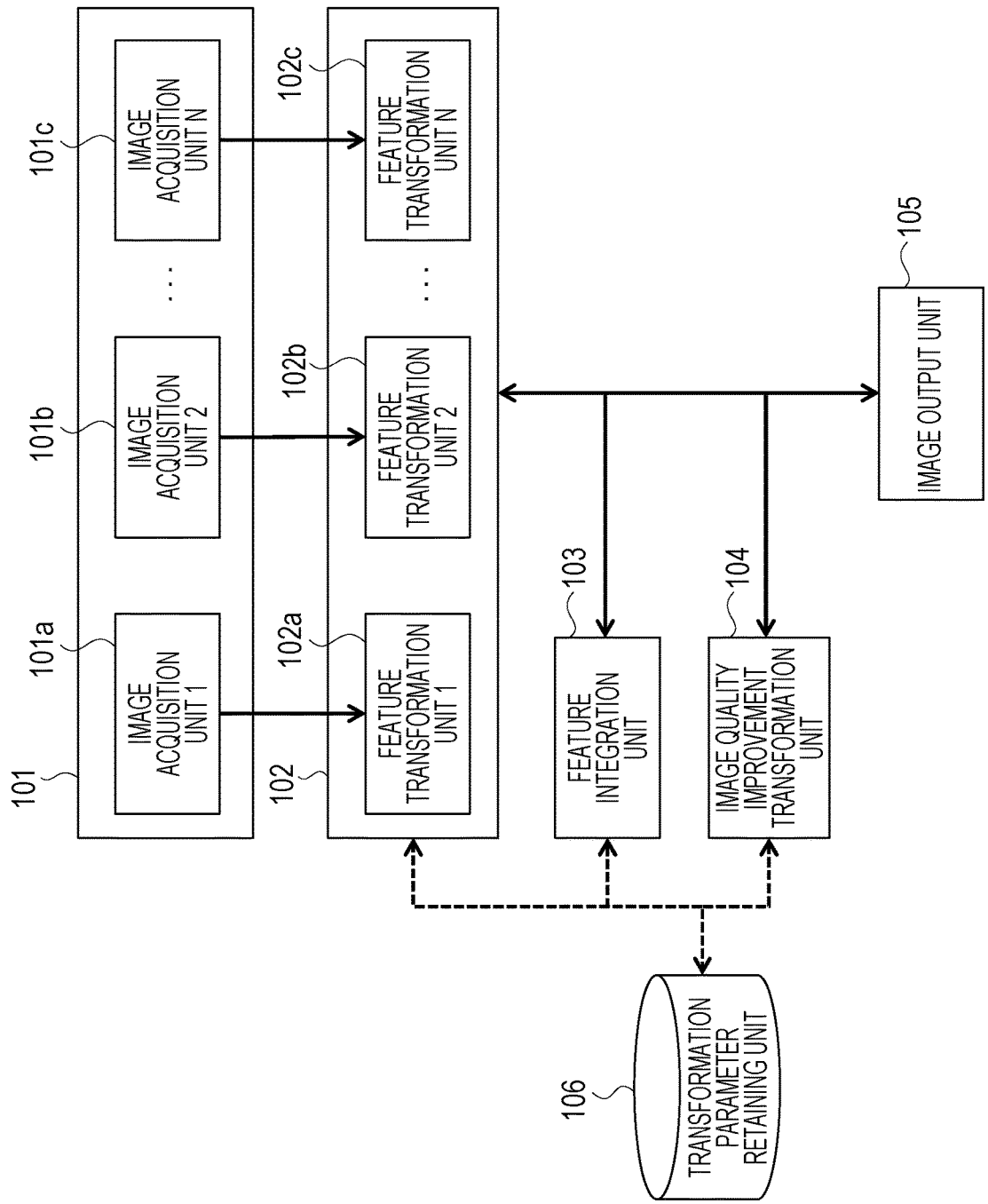
FIG. 2 is a diagram (No. 1) illustrating an example of the functional configuration of an image processing apparatus according to one or more aspects of the present disclosure.

Firstly, an outline of the image processing apparatus 10 of the embodiment is described with reference to a functional configuration diagram of FIG. 2. The image processing apparatus 10 includes image acquisition units 101a to 101c for acquiring a plurality of low quality images targeted for image processing, and feature transformation units 102a to 102c that transforms the acquired low quality image into features through neural networks (hereinafter abbreviated to NNs), as the functional configuration. Moreover, the image processing apparatus 10 includes a feature integration unit 103 that integrates the features of the NN, an image quality improvement transformation unit 104 that generates a high resolution image on the basis of the integrated feature, and an image output unit 105 that outputs the generated high quality image, as the functional configuration. Furthermore, the image processing apparatus 10 includes a transformation parameter retaining unit 106 that retains and supplies various parameters for a feature transformation, as the functional configuration.

Figure 3:
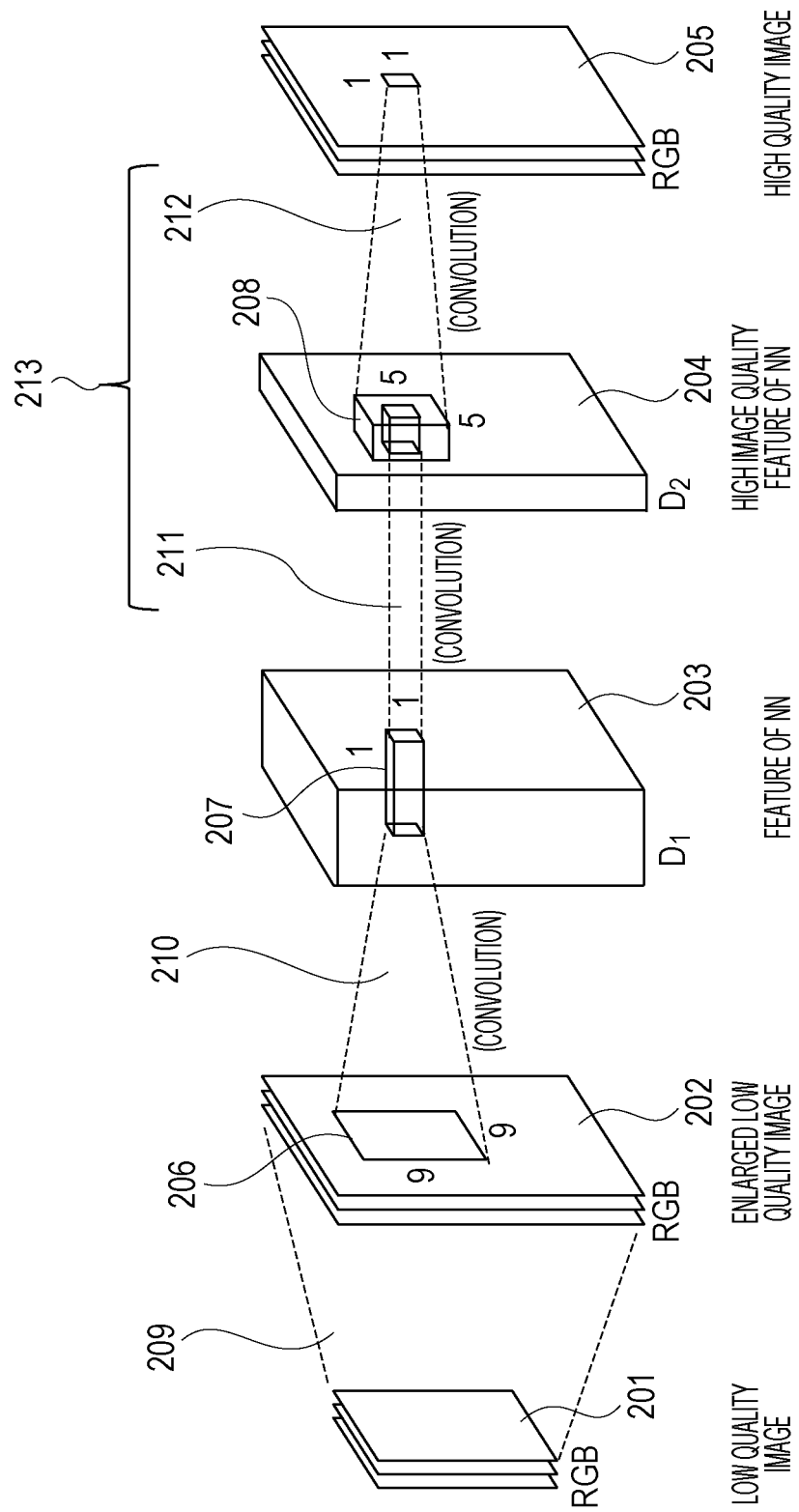
FIG. 3 is a diagram illustrating an example of a convolutional neural network according to one or more aspects of the present disclosure.

Next, in order to clarify a difference between a technique obtained by applying the embodiment and a known technique, an outline of a technique described in Chao Dong, Chen Change Loy, Kaiming He, and Xiaoou Tang, Learning a Deep Convolutional Network for Image Super-Resolution. Proceedings of European Conference on Computer Vision (ECCV), 2014, which is a known technique, is described. This technique is for generating an enhanced resolution image from one image. The technique uses a convolutional neural network (convolutional neural network, hereinafter abbreviated to CNN) as illustrated in FIG. 3. It can be seen that the technique is roughly organized into two parts: (1) a feature transformation process 210 for transforming an enlarged low quality image 202 into a feature 203 of an NN; and (2) an image quality improvement transformation process 213 for generating a high quality image 205 from the feature 203 of the NN.

Figure 4:
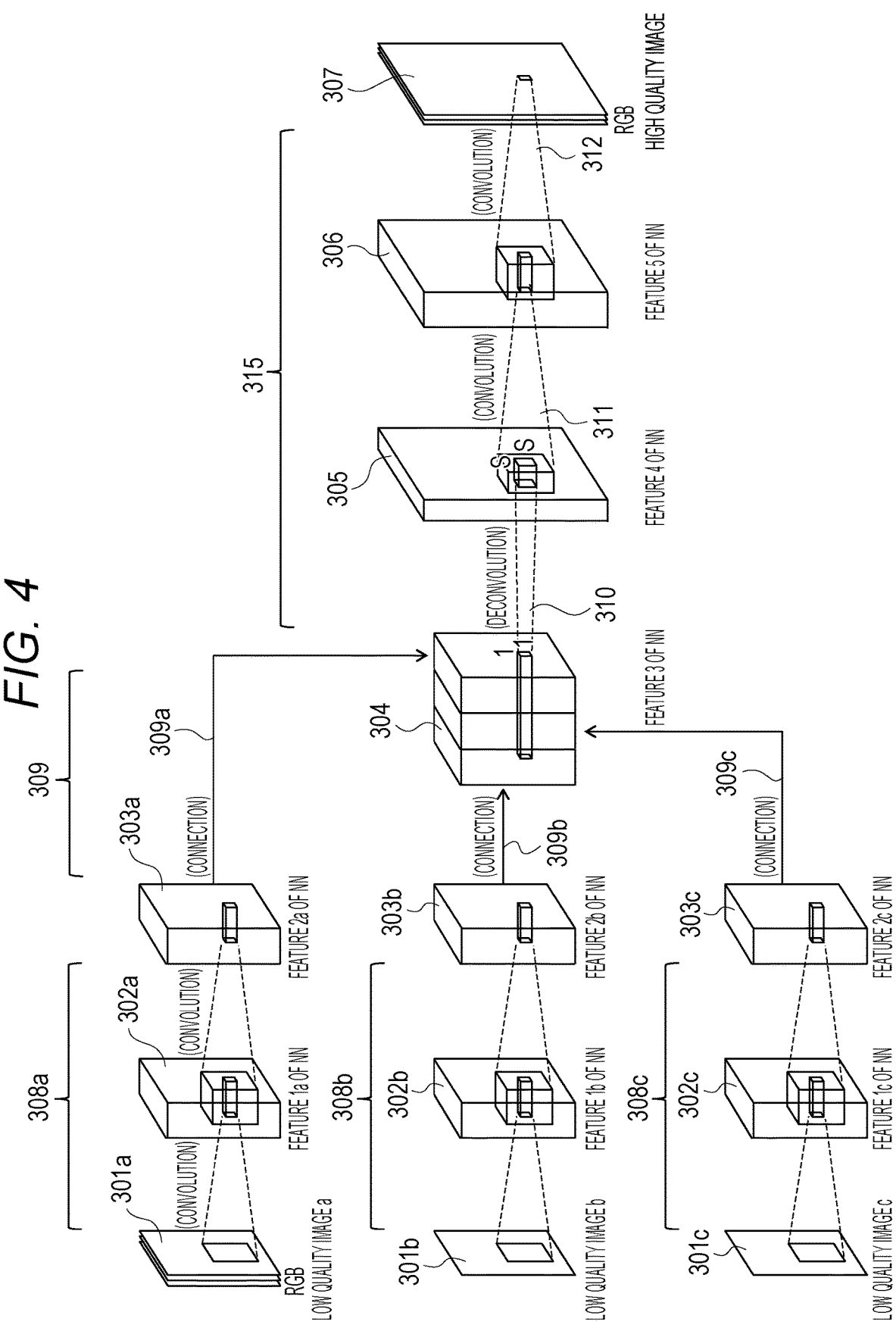
FIG. 4 is a schematic diagram illustrating processes of the first embodiment according to one or more aspects of the present disclosure.

The embodiment is described compared with the above known technique. As illustrated in a schematic diagram of FIG. 4, a plurality of low quality images 301a to 301c is assumed to be input. The low quality images are assumed to be images having different attributes such as an RGB color image, an infrared image, and an image captured with a flash. FIG. 4 illustrates three low quality images. However, the constituent number of low quality images can be any number equal to or greater than two.

The processes of the above known technique and the embodiment are different in the respect that a high quality image is complementarily generated using the images with the plurality of attributes. Moreover, the processes of the known technique based on image averaging as in Japanese Patent No. 4942221 and the embodiment are different in the respect that not pixels of an image but features are used and integrated at the time of integration. Moreover, the processes of another known technique and the embodiment are still different in the respect that before integration, each of the images with the plurality of attributes undergoes a feature transformation through its own NN, and is transformed into features with abstractness appropriate for integration. In the process of the embodiment, the feature connection is illustrated as one implementation mode of the integration of the images. However, as illustrated in the following embodiments, the integration method is not limited to the feature connection.

The image processing apparatus 10 of the embodiment performs feature transformations 308a to 308c that transforms the low quality images 301a to 301c into features 303a to 303c of the CNN. The feature transformations 308a to 308c each include a two-stage convolution process.

Next, the image processing apparatus 10 is different from the known technique in the respect of including a process of feature integration 309. In the process of the feature integration 309, the features 303a to 303c of the CNN of the low quality images are connected to obtain one feature 304 of the CNN. After the features are integrated into one, the image processing apparatus 10 performs a process of an image quality improvement transformation 315 on the feature 304, and obtains a result of a high quality image as a final output.

Figure 5:
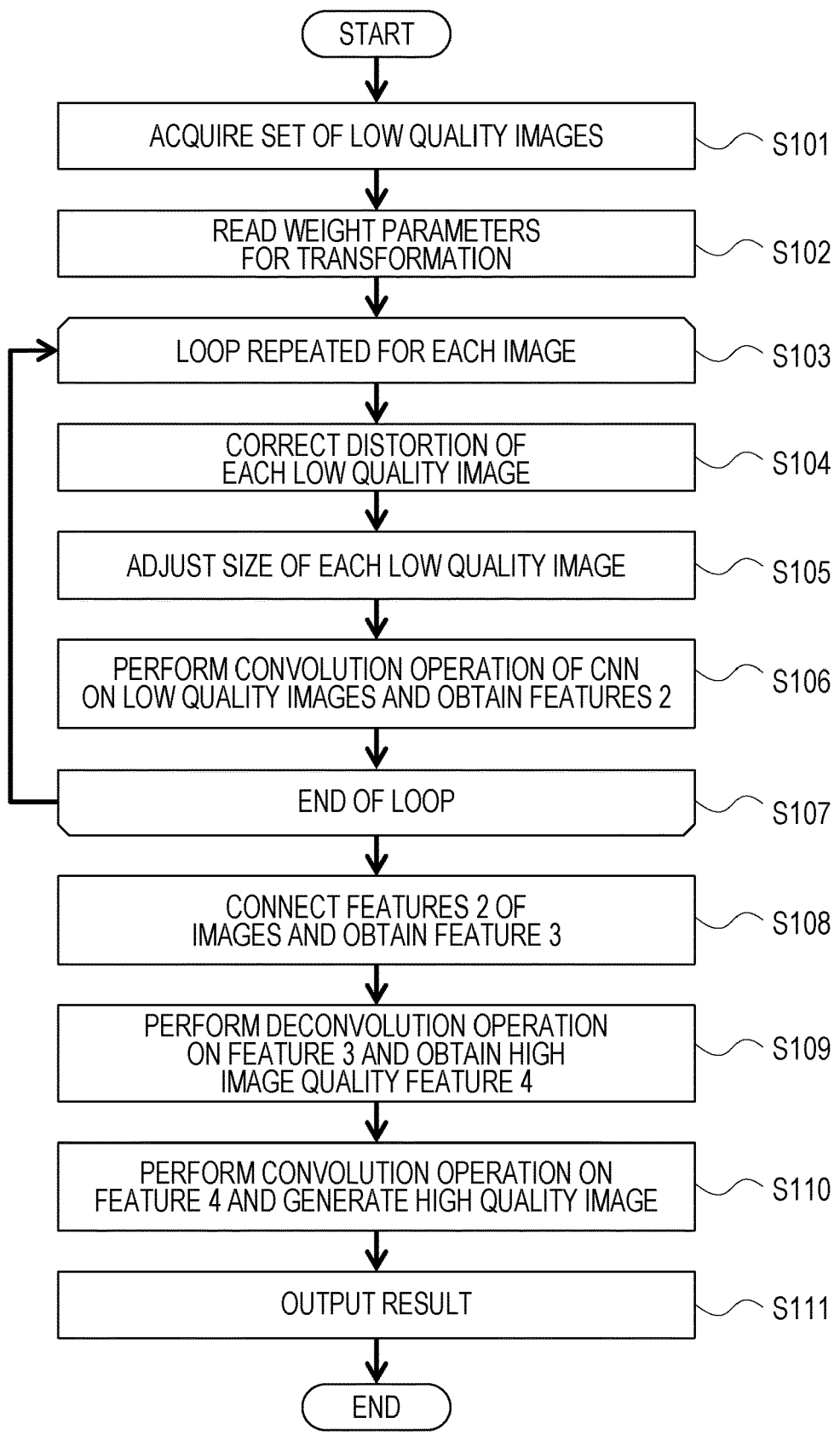
FIG. 5 is a flowchart illustrating an example of information processing of the image processing apparatus according to one or more aspects of the present disclosure.

Next, the operation of the image processing apparatus 10 is described in detail using a flowchart of FIG. 5. When the operation is initiated, the image acquisition units 101a to 101c acquire the low quality images 301a to 301c in S101. The acquired images are transmitted to the feature transformation units 102a to 102c, respectively. Next, in S102, the feature transformation units 102a to 102c and the image quality improvement transformation unit 104 reads transformation parameters for performing the transformation process from the transformation parameter retaining unit 106.

S103 to S107 are a loop process of performing the following process for each of the low quality images 301a to 301c. Firstly, in S104, the feature transformation unit 102 corrects a distortion of an image resulting from, for example, an optical configuration of the low quality image capture device. Furthermore, in S105, the feature transformation unit 102 adjusts the size and aspect in such a manner that the images agree in size and aspect ratio with each other. The feature transformation unit 102 may perform these correction processes using design values of an optical system and the low quality image capture device. Alternatively, intrinsic parameters of a camera may be estimated from, for example, a pre-captured pattern for calibration to make corrections.

Next, in S106, the feature transformation unit 102 transforms the low quality images 301a to 301c into the features 303a to 303c of the CNN. This is based on the following calculations of a convolution and an activation function in the embodiment.

$$f_{i+1} = \theta(f'_{i+1}),$$

$$\theta(x) = \text{Max}(0, x),$$

$$f'_{i+1}(x, y, d_{i+1}) = \Sigma_{di} \Sigma_{\Delta x} \Sigma_{\Delta y} f_i(x, y, d_i) w_i(x+\Delta x, y+\Delta y, d_i, d_{i+1}) + b_i(d_i)$$

$f_i$ and $f_{i+1}$ are features before and after the transformation. $f(x, y, d)$ is the d-th value of a multidimensional feature f related to a pixel $(x, y)$. $\theta$ is an activation function of half-wave rectification. $\Delta x$ and $\Delta y$ are coordinates of each pixel of an image patch of size S×S, and $\Delta x$, $\Delta y \in \{-S/2, \ldots, 0, \ldots, S/2\}$. Moreover, w is a transformation parameter of a fourth-order tensor. b is a bias term. An area outside the image is filled with a value of 0. The size of the image is assumed to be unchanged before and after a convolution operation.

The parameters w and b of the convolution operation are acquired in advance in a case learning method illustrated below. The convolution operation can be qualitatively assumed to be a coding process of a local patch for associating a low quality image with a high quality image being a post-transformation target.

A more specific description is given. An image is considered to be a set of small local patches. The image has spatial continuity. The same subject such as a sky or a wall has a repetitive pattern and a similar pattern. In addition, each patch can be efficiently approximated by a combination of codebooks of a finite number of patterns. This is codebook-based image compression. Each patch of the image is compressed into a codebook and its coefficient (coding), and the image can be generated from the sum of products of the coefficient and the codebook (decoding).

The image processing apparatus 10 of the embodiment also performs a partially similar process to the above process. What is different is that an image targeted for decoding is not an input image itself but a high quality image. Moreover, an information representation of a codebook in a middle stage is required to sufficiently represent high definition information and be robust against noise and the like.

The above known technique has demonstrated that a feature representation of an NN is adequate for this. Various pieces of information such as a combination of colors and the shape of an object are represented in different hierarchical levels in the layers of a CNN where a convolution operation is repeated a plurality of times. Moreover, a necessary type of representation is heuristically acquired according to the learned task. The above description is the background of a convolution operation of an NN to achieve a feature representation (coding) for improvement in image quality.

FIG. 4 illustrates a mode in which the above convolution operation is performed in two stages as each process of the feature transformations 308a to 308c. However, the number of stages of the convolution operation, the size of a convolution kernel at that time, the number of dimensions of a transformed feature, and the like are not limited to specific modes. Moreover, the transformation parameters of the feature transformations 308a to 308c may be different from each other.

Next, in S108, the feature integration unit 103 integrates the features 303a to 303c of the CNN obtained in the former stage, and generates the integrated feature 304. The integration process in the embodiment is a feature connection process as in the following equation:

$$f_3(x, y) = [f_{2a}(x, y)^T, f_{2b}(x, y)^T, f_{2c}(x, y)^T]^T$$

$f_{2a}(x, y)$, $f_{2b}(x, y)$, and $f_{2c}(x, y)$ are feature vectors related to the pixel $(x, y)$ of the features 303a to 303c of the CNN, respectively, and T is the transpose.

Figure 6A:
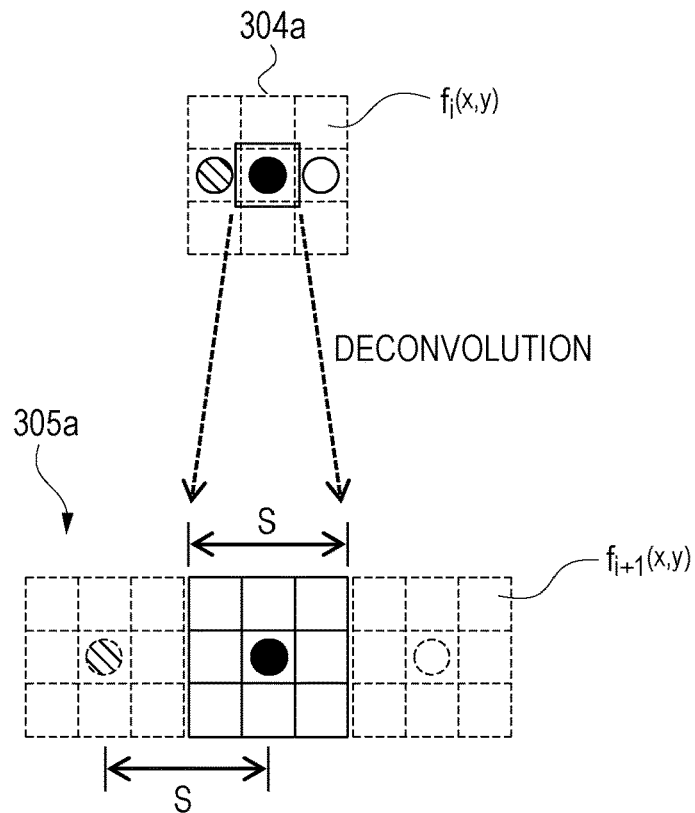
FIGS. 6A and 6B are diagrams illustrating examples of a deconvolution operation according to one or more aspects of the present disclosure.
Figure 6B:
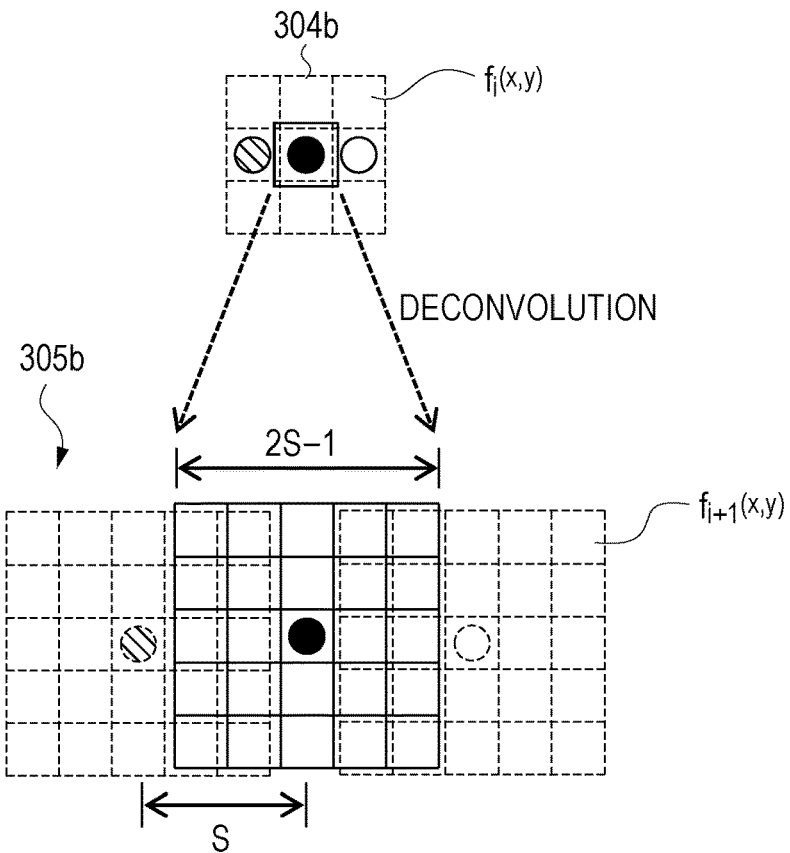

In S109, the image quality improvement transformation unit 104 performs a process of a deconvolution 310 on the integrated feature 304. As a result, a 1×1× $D_3$-dimensional feature of each pixel is transformed into an S× S× $D_4$-dimensional feature. This calculation is indicated as follows:

$$f_{i+1} = \theta(f'_{i+1})$$

$$f'_{i+1}(Sx+\Delta x, Sy+\Delta y, d_{i+1}) = \Sigma_{di} w'_i(\Delta x, \Delta y, d_i, d_{i+1}) f_i(x, y, d_i) + b'_i(\Delta x, \Delta y, d_{i+1}))$$

w' is a transformation parameter, b' is a bias term, $\Delta x$ and $\Delta y$ are elements of coordinates of an image patch obtained by transforming each pixel. The transformation of the above equation causes the feature 304 of the low quality image into a feature 305 with an S-times resolution. FIG. 6A is a schematic diagram illustrating a case where the size of the transformed image patch is equal to S. On the other hand, FIG. 6B illustrates a case where each transformed image patch is larger in size than S. In the latter case, an area overlapping between the transformed image patches is present. The value of each transformed pixel is summed in the overlapping area to use the sum as a feature.

In the above technique, a deconvolution operation is not performed and an input image is mechanically enlarged by the bicubic method. In contrast, the image processing apparatus 10 of the embodiment improves the resolution on the basis of case learning as described below, and weights are optimized through all the layers of the NN.

Next, in S110, the image quality improvement transformation unit 104 performs a process of a convolution 311 and a process of a convolution 312 on the high image quality feature 305 of FIG. 4, and obtains a color image 307 having three channels. In Sill, the image output unit 105 outputs a resultant high quality image. The image output unit 105 then ends the process of the flowchart illustrated in FIG. 5.

Parameters related to a series of transformations of the embodiment are acquired by learning in advance appropriate pre- and post-transformation relationships between an image and a feature from multiple case images. The operation at the time of learning is described below. In addition to the calculations of a convolution and an activation function described here, a process of normalizing the value of a feature may be combined with each stage of the NN. The detailed contents of variations of such a process are not an essential element for the embodiment. Therefore, they are not described in detail here.

(Learning Process)

Figure 7:
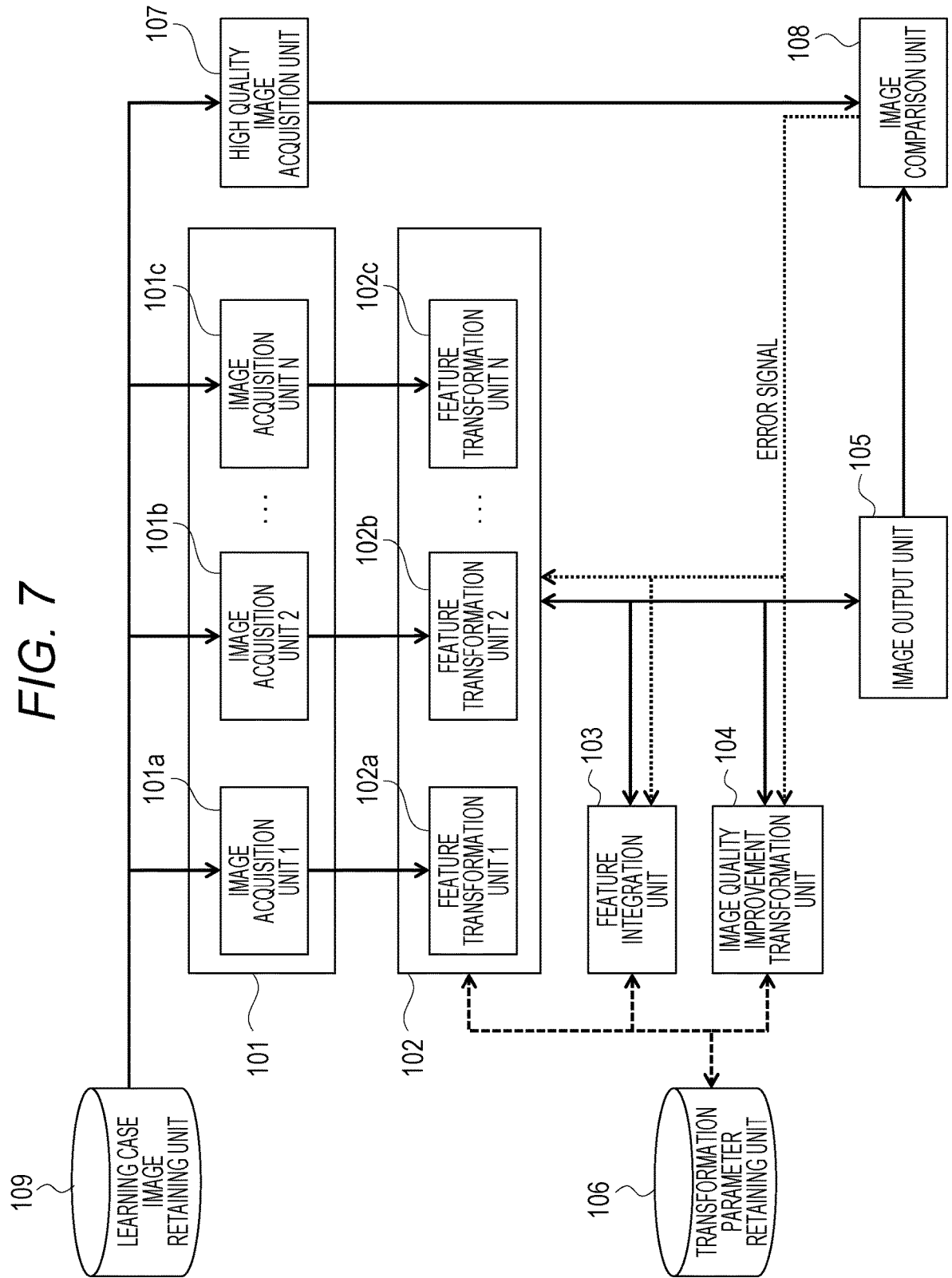
FIG. 7 is a diagram (No. 2) illustrating an example of the functional configuration of the image processing apparatus according to one or more aspects of the present disclosure.
Figure 8:
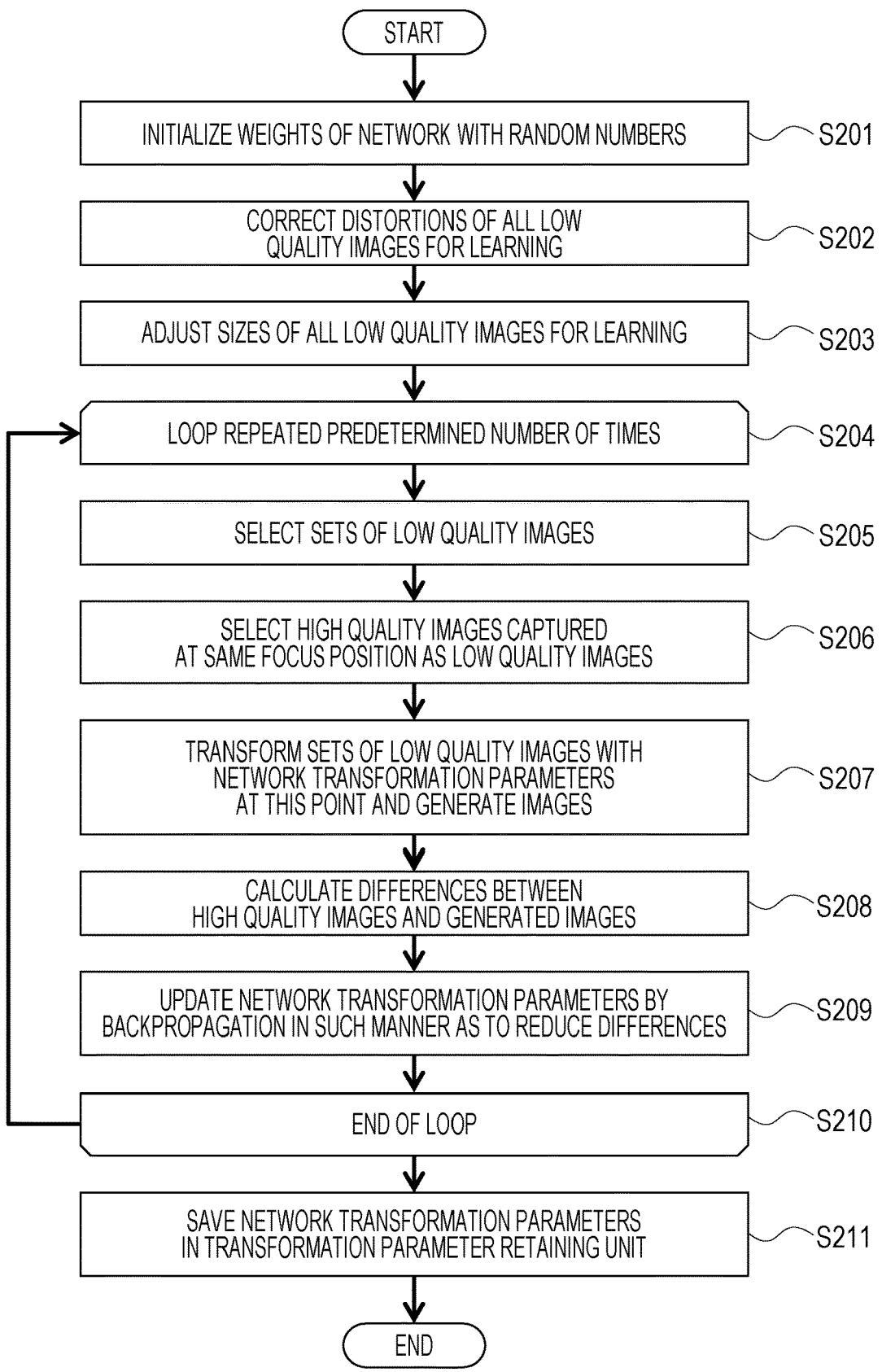
FIG. 8 is a flowchart illustrating a learning process of the first embodiment according to one or more aspects of the present disclosure.

Next, a description is given of the flow of the detailed process for acquiring weights of an NN of the embodiment, that is, appropriate transformation parameters by learning. A functional configuration diagram of the image processing apparatus 10 related to learning is as illustrated in FIG. 7. This configuration includes a high quality image acquisition unit 107, an image comparison unit 108, and a learning case image retaining unit 109, which have been newly added to FIG. 2. A flowchart of a learning process is described using FIG. 8.

Firstly, a set of case images used for learning is assumed to be obtained by capturing in advance images of various subjects, and saving the images in the learning case image retaining unit 109. The case images here include a group of low quality images captured by the image acquisition units 101a to 101c and a high quality image being a final target to be generated from the group of low quality images. An image capture device different from a group of low quality image capture devices is prepared to capture the high quality image. It is assumed here that the position of the image capture device is adjusted in such a manner as to make the viewpoint and focal plane the same as the group of low quality images to capture the high quality image.

When the learning process of the image processing apparatus 10 is initiated, the transformation parameter retaining unit 106 initializes all the parameters $\{w_i, b_i, w'_i, b'_i\}$ with random numbers first in S201. Next, in S202 and S203, the image acquisition units 101a to 101c read the low quality images of the image capture systems from the learning case image retaining unit 109, and perform a transformation in such a manner as to substantially align the subjects in the low quality images by correcting the distortion, size, and aspect of each image. The determined transformation parameters for image correction are saved in the transformation parameter retaining unit 106. The same values are also used at the time of recognition. The image acquisition units 101a to 101c return the corrected images to the learning case image retaining unit 109 and save them therein.

Unlike Japanese Patent No. 4942221 where low quality images are averaged, and the average is the final result, this image correction does not always need strict agreement at the pixel level. For example, if there is a displacement between images, when they are the same in size and aspect, the displacement manner is systematic. In other words, the same edge between the low quality images is always shifted by the same displacement. In this case, a filter whose center of the receptive field is displaced is learned for each of the feature transformations 308a to 308c of the low quality images in FIG. 4. In terms of the edge, texture, and the like of each image, a displacement is absorbed in the above transformation. The features are then integrated in the feature integration 309, and further transmitted to neurons in a higher layer to be associated with the high quality image.

Moreover, if a specific low quality image is distorted, or the low quality images are slightly different in aspect and size, a displacement occurs non-systematically. In such a case, filters whose centers of the receptive fields are blurred are learned for the feature transformations 308a to 308c. The size of the blur is proportional to a standard deviation of the non-systematic displacement between the low quality images. In this manner, the displacement between the low quality images is robustly absorbed by the filter of the NN.

The next processes from S204 to S210 are a loop to update a parameter to reduce an error in such a manner as to bring a transformation result close to a target image. The loop is repeated a predetermined number of times. Firstly, in S205, the image acquisition units 101a to 101c select n sets of low quality images. Next, in S206, the high quality image acquisition unit 107 acquires n high equality images on the same focal plane from the same viewpoint corresponding to each set of low quality images.

Next, in S207, the feature transformation units 102a to 102c, the feature integration unit 103, and the image quality improvement transformation unit 104 perform the transformation process in a predetermined order, using the values of the parameters for the transformation obtained up to this point. Consequently, the n high quality images are generated from the n sets of low quality images. Next, in S208, the image comparison unit 108 compares the generated n high quality images with n target high quality images, and calculates errors. A sum of the errors between the images is defined by the following squared error.

$$L = 1/n \Sigma_j 1/m_j \Sigma_c \Sigma_x \Sigma_y \| I^*_{jc}(x,y) - I^\smallfrown_{jc}(x,y) \|^2$$

$I^*_j$ is a true value of the j-th high quality image among the n data sets. $I^\smallfrown_j$ is a high quality image generated from the j-th set of low quality images. $m_j$ is a total number of pixels of the j-th image. c is an element representing three channels of RGB.

In S209, the image comparison unit 108 transmits error values to the feature transformation units 102a to 102c and the image quality improvement transformation unit 104. The parameters $\{w_i, b_i, w'_i, b'_i\}$ are changed by the following equation in such a manner as to minimize the error values.

$$W(t+1) = W(t) - \eta \partial L / \partial W(t)$$

W represents any of the parameters. $\eta$ is a learning coefficient. The error gradient term, $\partial L / \partial W$, is sequentially calculated from the final layer, using the backpropagation technique. When there is a connection between a neuron i in a certain layer and a neuron j in a layer higher than the certain layer, the gradient of an error of a parameter $W_{ij}$ of a weight of a connection is obtained by the following equation.

$$\partial L / \partial W_{ij} = (\partial L / \partial Z_j)(\partial Z_j / \partial W_{ij})$$

$Z_j$ is an output value of the neuron j.

The above update process is repeated a predetermined number of times. In S211, the feature transformation units 102a to 102c, the feature integration unit 103, and the image quality improvement transformation unit 104 then save all the parameters of the network in the transformation parameter retaining unit 106, and ends the process. There are also various derivative forms such as a type where a term called an inertial term or a weight attenuation term is added to the above learning update equation. The description of the process at the time of learning is finished here.

Figure 9A:
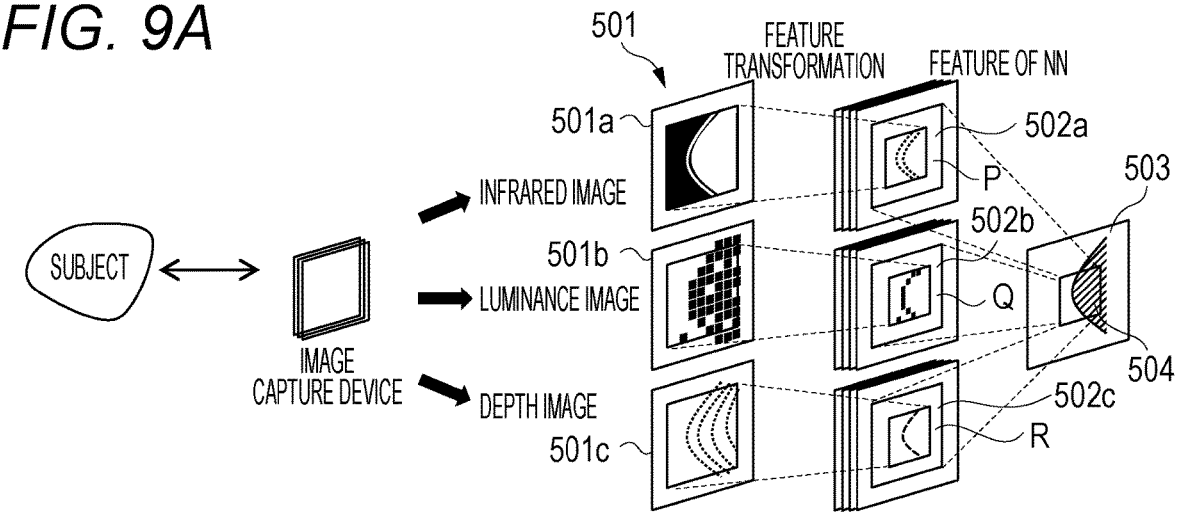
FIGS. 9A to 9C are diagrams for explaining a mechanism for improvement in image quality according to one or more aspects of the present disclosure.

Next, a qualitative description is given of a mechanism for improvement in image quality of the embodiment. In a schematic diagram of FIG. 9A, low quality images 501a to 501c whose attributes are different from each other, such as an infrared image, a luminance image, and a depth image, are captured and input. The images are assumed to be images which have a low resolution and noise as in the luminance image 501b, which includes fringes along boundaries due to chromatic aberration as expressed by a double line in the infrared image 501a, and which blurs over the entire surface as in the depth image 501c.

The image processing apparatus 10 transforms each image into features through the NN. An area of each image is decomposed into abstract high dimensional features related to the appearance of a subject, such as the shape of a contour and the texture of a surface. Next, the image processing apparatus 10 connects and integrates features 502a to 502c of the plurality of images. The images of the different attributes are then aggregated at a feature level. Next, the case-based learning allows the high dimensional feature vector and a pattern 504 of a local area of a high quality image 503 being a post-transformation target to be associated and stored. Furthermore, all the transformation parameters of the layers of the NN are optimized through the learning. In such a mechanism, the image processing apparatus 10 of the embodiment can generate the high quality image 503 using the group of low quality images of the different attributes.

In order to further clarify the mechanism of the embodiment, a known image quality improvement method is compared here. Known methods that use different attribute images complementarily include a method described in Qiong Yan, Xiaoyong Shen, Li Xu, Shaojie Zhuo, Xiaopeng Zhang, Liang Shen, and Jiaya Jia, Cross-Field Joint Image Restoration via Scale Map. IEEE International Conference on Computer Vision (ICCV), 2013. In this method, edges are extracted from an infrared image captured by an infrared flash, and edge-preserving smoothing are performed on a visible light image using the edges. Such a method requires to adjust the position of an edge and individually handle noise such as a missing edge and a pseudo-edge of the infrared image.

In contrast, in the embodiment, a case is considered in which there are a discrepancy in edge between low quality images and a discrepancy such as fringes of color due to aberration. Local patches of a low quality image include partial areas of various subjects. Many patches of similar contours and textures are extracted from the same subject such as a sky or wall. If a discrepancy between two different types of images is systematic, and the contours are always displaced by the same amount in the same direction, then there are multiple patches including similar displacements of contours. When an NN transforms local patches into features (coding), the weights of a convolution operation are learned also taking their displacements as a part of the pattern. Hence, the discrepancy between the images is absorbed by the feature transformation of the NN.

Furthermore, assume that the direction and amount of displacement between different types of images are not constant, and a displacement occurs by a different amount in a different direction according to the position in the image, the distance to the subject, and the like. In this case, it is difficult to absorb a discrepancy with one convolution operation. However, there is a possibility that a plurality of variations in the above displacement is individually learned, and coding can be appropriately performed as the contour through feature transformations in the plurality of layers of the NN.

As described above, in the embodiment, a discrepancy between different types of images is absorbed by learning to enable complementary use of each image. As in the above-mentioned paper of Qiong Yan et al., a user does not need to individually handle discrepancies between the different types of images.

Moreover, the known method such as Japanese Patent No. 4942221 is further compared. In Japanese Patent No. 4942221, a user gives the value of an image to be synthesized on a virtual focal plane. The positions of a group of images are displaced accordingly, and the images are superimposed and averaged. In contrast, in the embodiment, the above-mentioned process is not performed. The image processing apparatus 10 of the embodiment deals with an image having a different focal plane as another learning case even if a subject is the same. In learning, a correspondence relationship between a feature of a low quality image and a local area of a high quality image is stored according to the case where the focal plane is different. Hence, when a group of low quality images captured on a certain focal plane is provided as inputs, the image processing apparatus 10 transforms the images in such a manner as to reproduce a high quality image captured on the corresponding focal plane.

In this manner, the image processing apparatus 10 performs the image quality improvement process on a case basis. Hence, in terms of the types of image quality improvement process, not limited to resolution enhancement but various modes can be achieved. Various image quality improvement processes such as dark current noise reduction, color correction, sharpening, a change in depth of field, removal of a blur, and removal of a fog and a haze can be achieved.

However, in order to perform these processes with high accuracy, it is required that a low quality image carries necessary information to distinguish a signal and noise, and that a wide selection of cases is prepared to learn cases. In order to, for example, remove a fog and a haze, it is desired to have a multi-band (for example, infrared) image that can capture a subject hidden in the fog to some degree. Moreover, in order to reduce dark current noise, a wide selection of case sets that allow learning of a difference between a dark current and a normal pattern is required.

(Modifications)

Figure 10A:
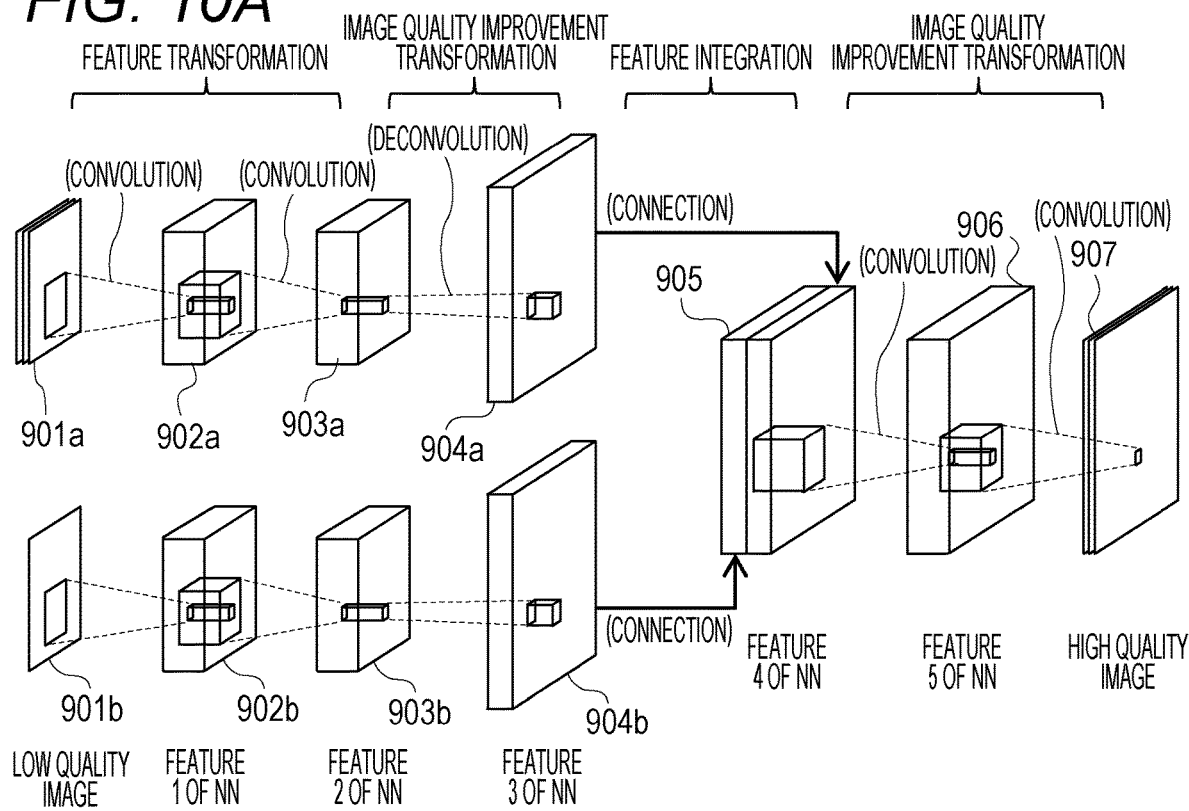
FIGS. 10A to 10D are diagrams for explaining modifications of the first embodiment according to one or more aspects of the present disclosure.

The image processing apparatus 10 may be configured as in FIG. 10A as a modification of the first embodiment. Unlike the first embodiment described above, the image processing apparatus 10 of the modification performs an image quality improvement process first by a deconvolution on features 903a and 903b of low quality images, and generates high image quality features 904a and 904b. The image processing apparatus 10 subsequently performs a feature connection process. In this manner, there can be modes where the order of the processes is reversed, or the process is separated into a plurality of stages, and executed. Moreover, the high resolution transformation of a deconvolution may be separated into a plurality of phases and is made little by little into high image quality features.

Figure 10B:
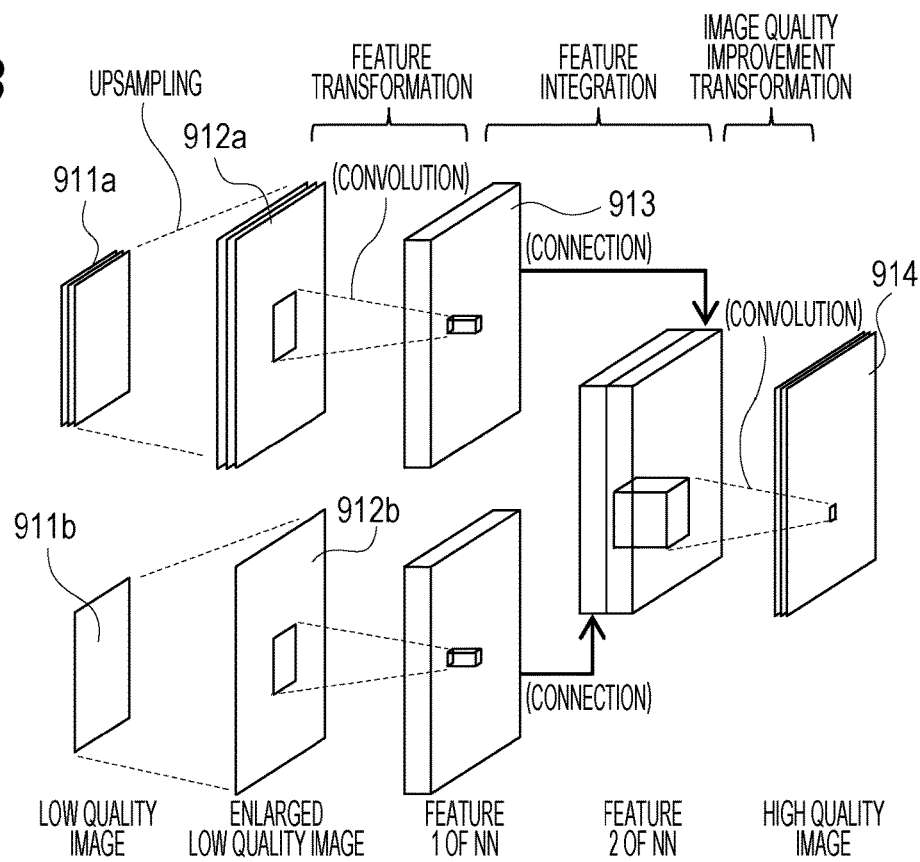

Moreover, in the first embodiment, a deconvolution operation based on learning is used to obtain a high image quality feature. However, as illustrated in FIG. 10B, the image processing apparatus 10 may upsample low quality images 911a and 911b first by a general image processing technique such as bicubic interpolation, and transform them into features of NNs. Moreover, as another modification, the image processing apparatus 10 may use a two-stage transformation including an enlarged copy of a feature called unpooling and a convolution operation, which is illustrated in Alexey Dosovitskiy, Jost Tobias Springenberg, and Thomas Brox, Learning to Generate Chairs with Convolutional Neural Networks. Proceedings of 28th IEEE Conference on Computer Vision and Pattern Recognition (CVPR), 2015, instead of a deconvolution operation.

Figure 10C:
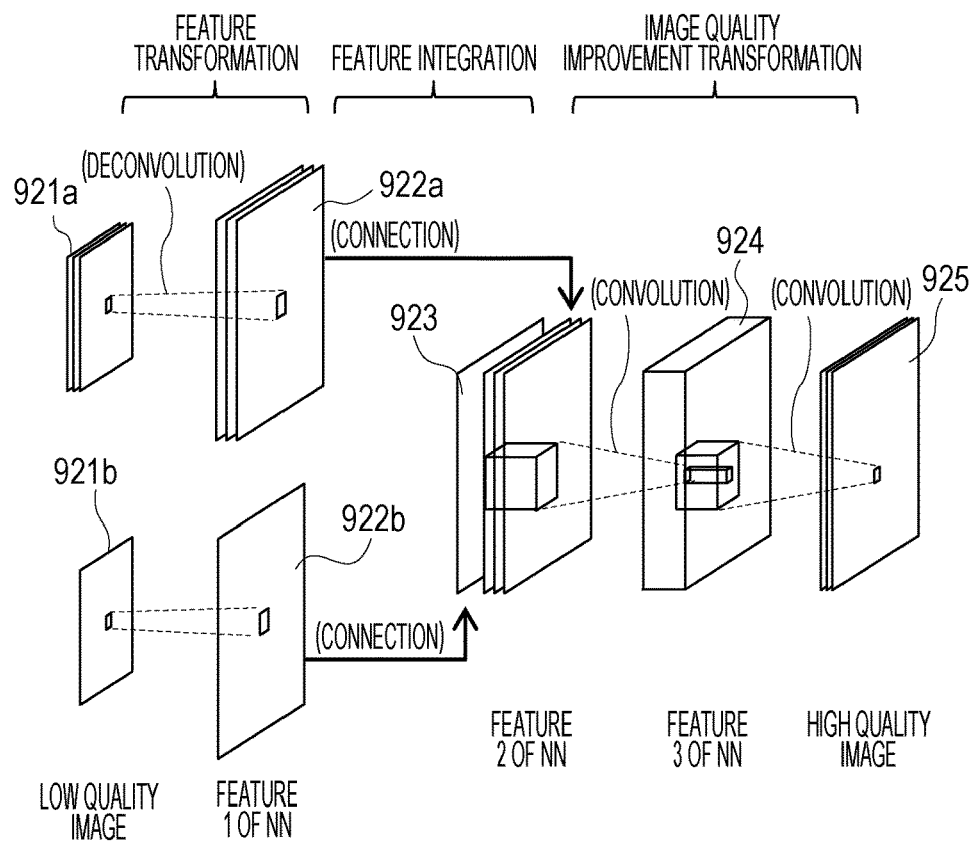

Moreover, as another modification, as illustrated in FIG. 10C, the image processing apparatus 10 may be in a mode that performs a feature transformation also for resolution enhancement by a deconvolution operation in the first stage, and then performs feature integration and image quality improvement.

Moreover, as another modification, the image processing apparatus 10 may be in a mode that regards an image itself as features, connects all channels of images of different attributes in the first stage, and then performs the image quality improvement transformation by a convolution.

Figure 10D:
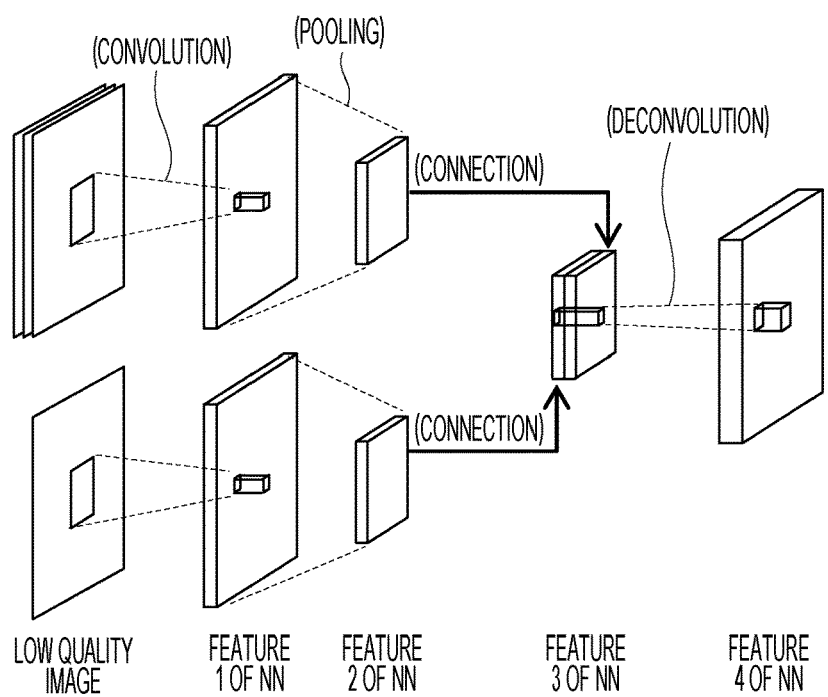

Moreover, as another modification, the image processing apparatus 10 may combine a pooling process. Pooling is a process of aggregating features of a plurality of pixels into a feature of one pixel, and has an effect that the response of a neuron is robust against the distortion and displacement of a pattern. However, the spatial resolution of a feature is reduced. In order to complement it, the image processing apparatus 10 may enlarge a feature again by linear interpolation or the like after pooling, and restore the resolution by a deconvolution operation. FIG. 10D illustrates an example of a part of the modification. A configuration is illustrated here in which pooling is performed after the convolution operation, features between the different attributes are connected, and the resolution is enlarged again by a deconvolution operation.

Moreover, in the embodiment, the transformation parameters of a convolution and a deconvolution are constant irrespective of the position in an image. However, different parameters may be used according to the position in an image. In this modification, it can be expected to effectively learn and remove the causes of degradation such as specific aberration and reduction in peripheral brightness, which are likely to occur at an end of an image.

Moreover, as another modification, the image processing apparatus 10 may use, as low quality images, image data by special imaging techniques called, for example, coded imaging and compressed sensing. For example, Levin, A., Fergus, R., Durand, F., and Freeman, W. T., Image and depth from a conventional camera with a coded aperture. ACM Trans. Graph. 26, 3 (2007), 70 illustrates an example where when an image captured with an aperture of a special mask pattern called a coded aperture is used, the depth estimation of a subject is facilitated. As a realization example of a low quality image acquired by the image acquisition unit 101, image data as in the document may be used. When such image data and a normal luminance image are combined, images having different properties can be complementarily used. Accordingly, the accuracy can be expected to be improved.

Likewise, for example, Dengyu Liu, Jinwei Gu, Yasunobu Hitomi, Mohit Gupta, Tomoo Mitsunaga, Shree K. Nayar: Efficient Space-Time Sampling with Pixel-Wise Coded Exposure for High-Speed Imaging. IEEE Trans. Pattern Anal. Mach. Intell. 36(2): 248-260 (2014) illustrates a technology for controlling image capture timings individually according to image capture devices, capturing n images, and obtaining a moving image of n frames having different variations. It may be a mode that inputs such an image as image data having n channels as one of low quality images of the embodiment.

Moreover, in the embodiment, it is assumed that low quality images are adjusted in focal plane and captured. As a modification, it may be configured in such a manner that one of the low quality images is set as a reference image, the focal plane is operated to perform image capture, and the focal plane of the remaining low quality images is always fixed. Images other than the reference image are images captured at a large depth of field (what is called deep focus). In the modification, information on the focal plane is used as a clue from the reference image, and only information on appearance is used from the remaining images. Consequently, as in the previous modes, a high quality image such as captured on a focal plane corresponding to a focal plane of an input image is generated.

Second Embodiment

In the first embodiment, the configuration is described in which the viewpoint positions of each low quality image obtained by the image acquisition unit of the image processing apparatus 10 and a high quality image obtained by transforming the low quality images are the same. In a second embodiment, a configuration is described in which the viewpoint positions of each low quality image and a high quality image are different. The embodiment has a simpler configuration since the embodiment does not need the splitting of a light ray, and the like, unlike the first embodiment. On the other hand, parallax that does not occur in the first embodiment occurs between images. Accordingly, more complicated image transformation parameters need to be learned.

The image processing apparatus 10 of the embodiment is assumed to include an image capture unit 1000 as a hardware configuration. FIG. 11A illustrates an example of an external view of the image capture unit 1000. Here, an example is illustrated in which a housing of the image capture unit 1000 includes two low quality image capture devices 1011a and 1011b. The purpose of the process of the embodiment is to generate an image such as captured by a high quality camera at a virtual viewpoint position 1012 from low quality images captured by the two low quality image capture devices. As illustrated in FIG. 11B, let a displacement between the viewpoint position of the i-th low quality image capture device and a virtual viewpoint position of a high quality image be pi. The functional configuration of the embodiment is similar to that of FIG. 2 of the first embodiment.

Figure 12:
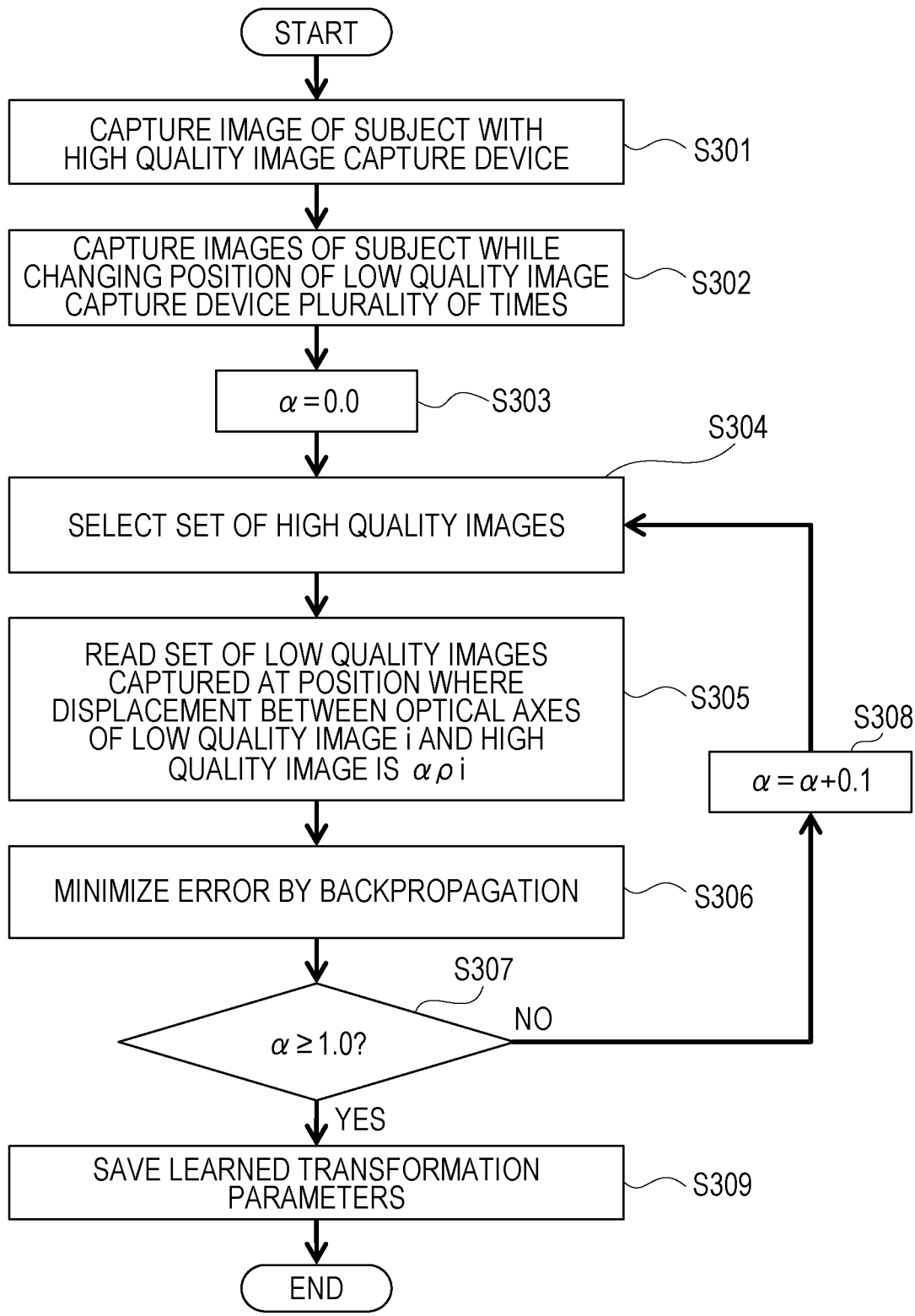
FIG. 12 is a flowchart illustrating an example of a learning process of a second embodiment according to one or more aspects of the present disclosure.

Next, information processing at the time of learning in the embodiment is described using FIG. 12. The functional configuration diagram at the time of learning is similar to that of FIG. 7 of the first embodiment. Firstly, a high quality image capture device for capturing high quality learning image data is separately prepared as a preparation for a learning process. It is assumed to include a system that can capture images while freely and individually moving viewpoints of the high quality image capture device and the low quality image capture devices 1011a and 1001b.

Firstly, when the learning process is initiated, the learning case image retaining unit 109 captures an image of a subject for learning with the high quality image capture device, and saves the image in S301. Next, in S302, the learning case image retaining unit 109 captures images of the same subject with the two low quality image capture devices 1011a and 1001b, and saves the images. At this point in time, the learning case image retaining unit 109 performs image capture a plurality of times while displacing the positions of viewpoints of the low quality image capture devices 1011a and 1001b by a predetermined displacement in a horizontal direction. Consequently, high quality images of various subjects and a plurality of low quality images obtained by capturing the same subjects in different parallaxes are saved in the learning case image retaining unit 109.

Next, S303 to S307 are a loop to learn and update each transformation parameter. In the loop, a variable a is incremented by 0.1 from zero to one. In S304, the high quality image acquisition unit 107 selects and acquires n high quality images from the learning case image retaining unit 109. Next, in S305, the image acquisition units 101a and 101b each select and acquire n images corresponding to the high quality images from the learning case image retaining unit 109. At this point in time, the image acquisition units

101a and 101b each select images captured at a position of a displacement $\alpha\rho_i$ according to the value of $\alpha$, respectively, as illustrated in FIG. 11C.

Consequently, images from the same viewpoint positions are given as learning images in the early stage of learning, and images captured from true viewpoint positions are gradually given with the progress of learning. Consequently, learning is made simple to prevent falling into a local solution and the like. In S306, the feature transformation units 102a and 102b and the image quality improvement transformation unit 104 update the transformation parameters. This step includes S306a to S306c. This process is the same as the process operation (S207 to S209 of FIG. 8) at the time of learning described in the first embodiment. Accordingly, its detailed description is omitted.

Consequently, images from the same viewpoint positions are given as learning images in the early stage of learning. Images captured from true viewpoint positions of the image capture unit 1000 of the image processing apparatus 10 are gradually given with the progress of learning. Consequently, learning is made simple, and it is possible to prevent falling into a local solution and the like. When learning in $\alpha=1.0$ is finished, the feature transformation units 102a and 102b and the image quality improvement transformation unit 104 save the transformation parameters of the NNs in the transformation parameter retaining unit 106 in S309. For example, the feature transformation units 102a and 102b and the image quality improvement transformation unit 104 then end the process of the flowchart illustrated in FIG. 8.

Figure 9B:
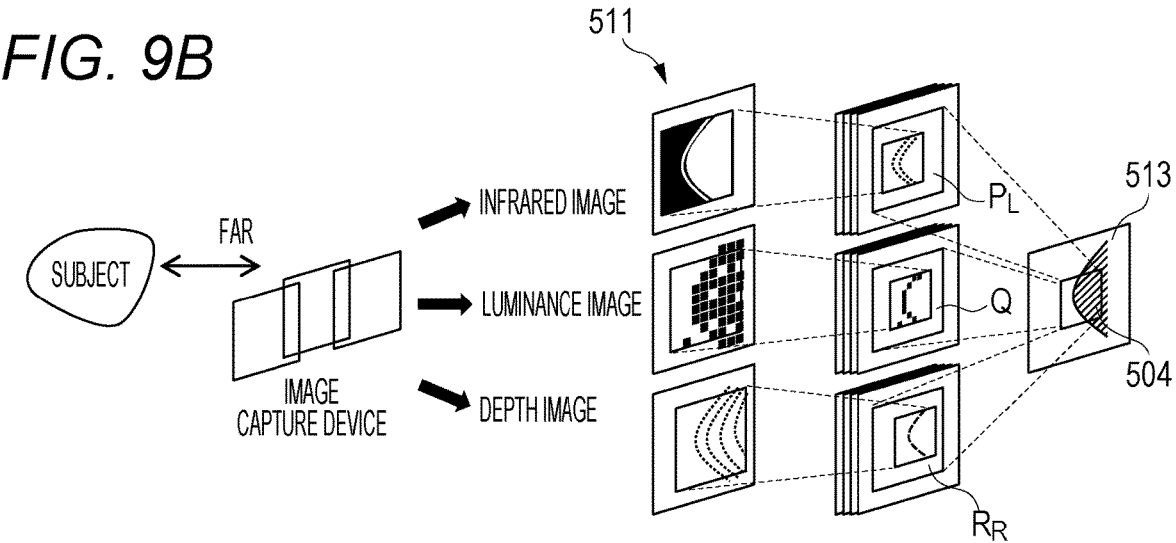
Figure 9C:
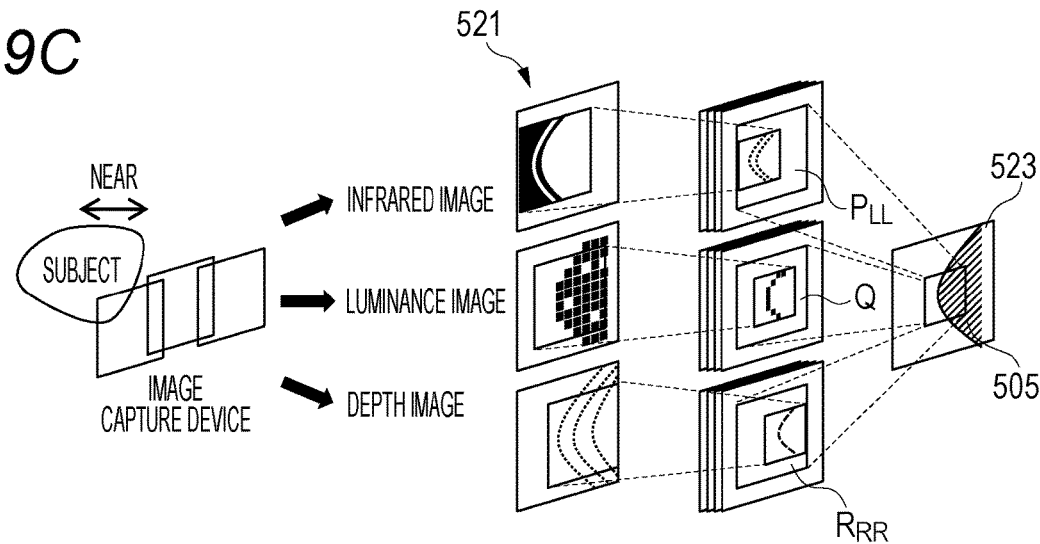

Next, a qualitative description is given of the mechanism for improvement in image quality of the embodiment. When images are captured by a plurality of low quality image capture devices in different viewpoint positions, parallax occurs in an image group 511 and an image group 521 according to the distances to a subject as illustrated in FIGS. 9B and 9C. However, displacements between images do not occur irregularly, but move along epipolar lines, respectively, according to the change in distance to the subject (the epipolar line is described in detail in a fourth embodiment).

Let feature representation patterns obtained by transforming each image in the image group 511 into features be $P_L$, Q, and $R_R$. When images of the subject are captured in a near distance, further displaced patterns $P_{LL}$, Q, and $R_{RR}$ are obtained as illustrated in FIG. 9C. Here, the patterns P (illustrated with an assigned symbol in FIG. 9A), $P_L$, and $P_{LL}$ are patterns whose shapes are almost the same but positions are different. It is known that neurons in an upper layer of the CNN not only respond selectively to various shapes but also have selectivity of displacement of the pattern. The sets of vectors of responses of the neurons representing P, $P_L$, and $P_{LL}$ is similar to and slightly different from each other. In other words, a one-dimensional manifold related to displacements of the image patterns is configured.

At the time of learning, the feature representation vectors ($P_L$, Q, $R_R$) are stored associated with an appearance 504 in a local area of a high quality image 513. The feature representation vectors ($P_{LL}$, Q, $R_{RR}$) are associated with an appearance 505 when the same local area is captured in a near distance. In this manner, each pattern is associated with the high quality image and stored.

When the feature representation vectors (P, Q, R), ($P_L$, Q, $R_R$), and ($P_{LL}$, Q, $R_{RR}$), . . . , of neurons indicate response patterns different from each other, it is difficult for a finite number of neurons to associate and store every low quality image and the high quality image.

However, the vectors of responses of neurons for the sets of patterns {P, $P_L$, $P_{LL}$} and {R, $R_R$, $R_{RR}$} are a one-dimensional manifold. A set of the vector groups {(P, Q, R), ($P_L$, Q, $R_R$), ($P_{LL}$, Q, $R_{RR}$)} is also a one-dimensional manifold. A response pattern of a neuron is a high-dimensional manifold also having variations in shape other than displacement. Here, the topic, however, is limited only to displacement for simplicity.

An NN is publicly known as a technique that allows a manifold pattern to be efficiently learned, and especially an autoencoder to reduce the dimension of a manifold pattern is widely known. The image processing apparatus 10 of the embodiment reduces the dimension of a high-dimensional input image pattern to features of the NN, ties the features to an output image pattern, and decodes them back to the image. This can regard the input and output data as a type of autoencoder that is asymmetrical between low image quality and high image quality.

As a result of the above, even if the subject in the images is displaced due to parallax as in FIGS. 9B and 9C, they can be efficiently associated with an area in a high quality image, and stored. As a result, a high quality image can be generated from various low quality images. The above description is of the mechanism of the embodiment.

Third Embodiment

In the second embodiment, the mode is described in which viewpoint positions of each low quality image and a high quality image are not the same. In the above embodiment, if the viewpoint positions are apart, and parallax occurs to such an extent as to exceed the size of the receptive field of a neuron, images cannot be associated. Accordingly, there is a problem reducing the accuracy. When a CNN includes more layers, the receptive field of a neuron in a higher layer can be increased in size. However, an NN having multiple layers has a difficulty in learning. Hence, a process to solve such a problem, and the like are disclosed in the embodiment; meanwhile, it is illustrated that various modes including, but not limited to, the operation of connecting features, can be taken by the feature integration unit in the embodiment.

The image processing apparatus 10 of the embodiment includes a plurality of image acquisition units that acquire low quality images from different viewpoint positions as in the second embodiment. The purpose of the process of the image processing apparatus 10 is assumed to create an aesthetically pleasing image with a small depth of field such as captured with a large aperture lens, from a plurality of low quality images acquired. In the embodiment, such a high quality image can be obtained also from an optical system whose physical size is small or configuration is simple.

The functional configuration of the image processing apparatus 10 is as illustrated in FIG. 13A. FIG. 13A is different from the previous embodiments in the following two respects: one is the inclusion of a subject distance acquisition unit 1007, and the other is the inclusion of M feature transformation units 1002x to 1002z corresponding to a parallax of a pattern.

Figure 14A:
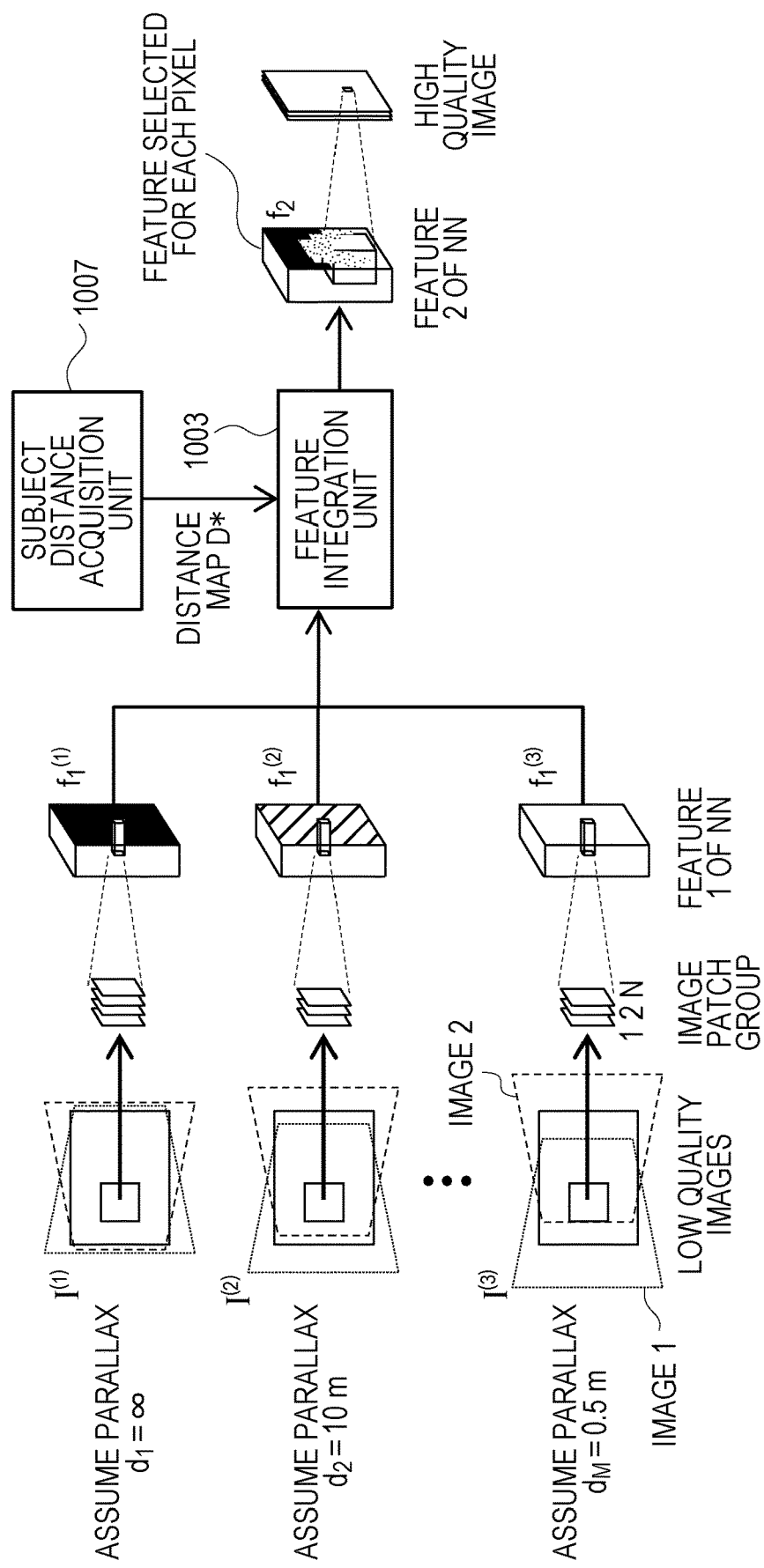
FIGS. 14A to 14C are diagrams for explaining information processing of the third embodiment according to one or more aspects of the present disclosure.
Figure 15A:
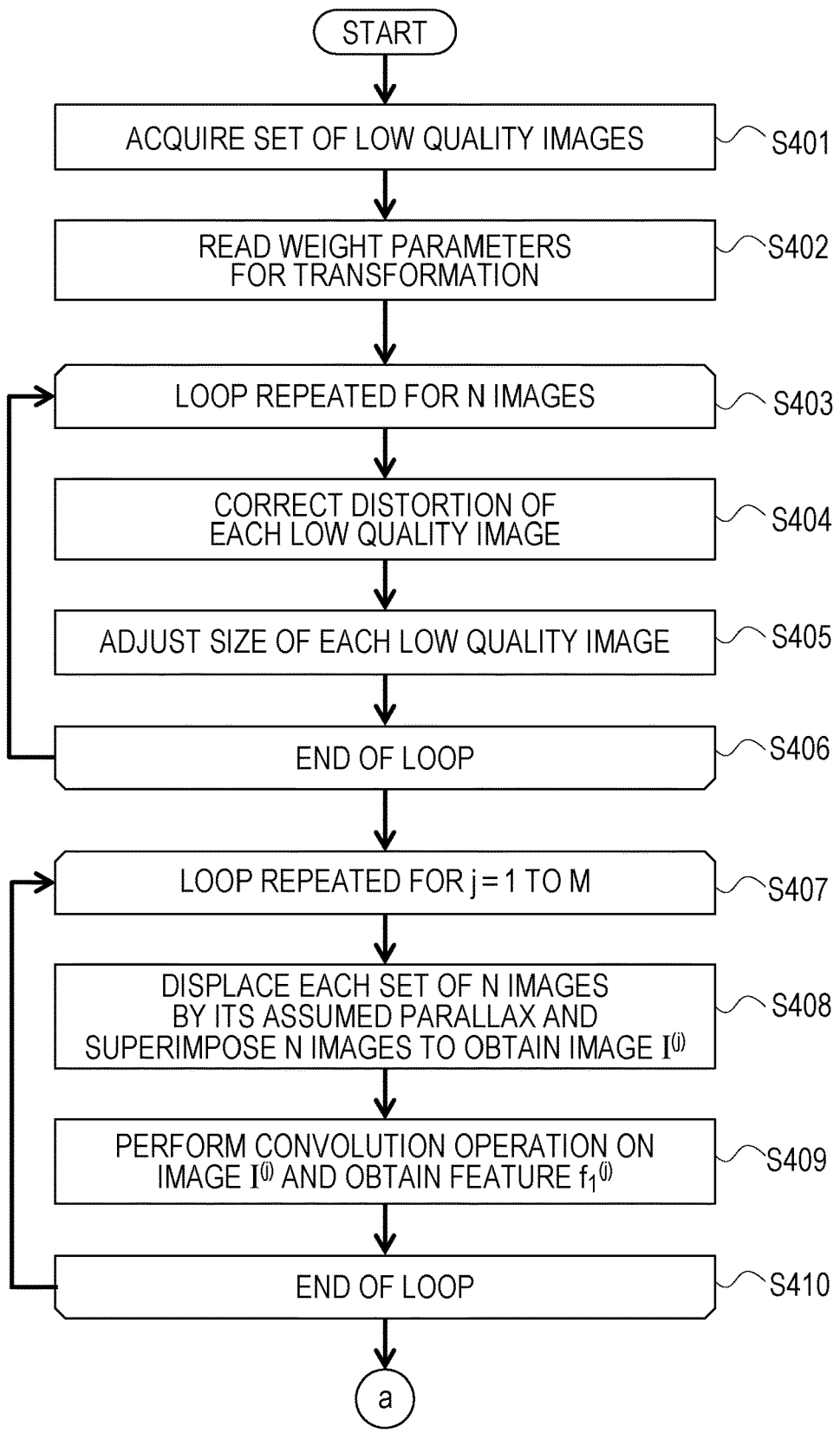
FIGS. 15A to 15C are flowcharts illustrating examples of the information processing of the image processing apparatus according to one or more aspects of the present disclosure.
Figure 15B:
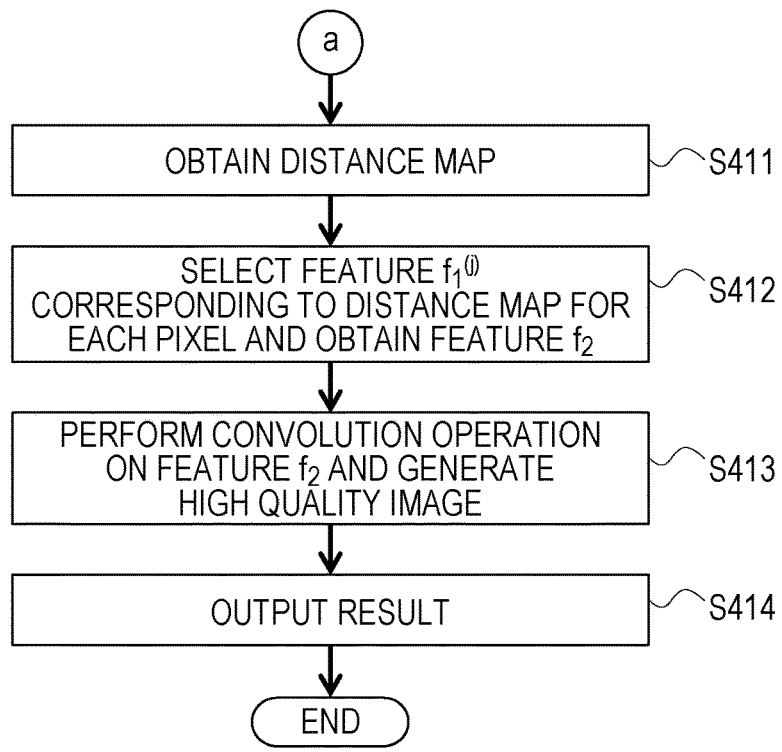

The information processing of the image processing apparatus 10 is described using FIGS. 14A, 15A, and 15B. When the image processing apparatus 10 initiates its operation, similar processes to the above embodiments are performed in S401 to S406. In other words, low quality image acquisition units 1001a to 1001c acquire N images, and correct distortions and sizes of the images. If optical axes of the low quality image capture devices and a virtual viewpoint position of a high quality image are not parallel at the time of distortion correction in S404, the image processing apparatus 10 makes a correction together by a projective transformation in such a manner as to make image planes of the low quality images and the high quality image parallel.

Next, S407 to S410 are a loop of a process of performing M different feature transformations on the set of low quality images obtained in the previous stage. Here, the M feature transformations correspond to cases of M different parallaxes, respectively. In S408, the feature transformation units 1002x to 1002z assume that there is a subject on a focal plane at a distance $d_j$, and displace the images by a predetermined amount in a predetermined direction in such a manner that the positions of all the images agree on the focal plane, and superimpose the images. The N superimposed images are represented in a symbol $I^{(j)}$ in FIG. 14A. The feature transformation units 1002x to 1002z uniformly perform the above process irrespective of the distance to the subject during image processing.

FIG. 14A illustrates three parallax patterns of $d_1$=infinity, $d_2$=10 m, and $d_M$=0.5 m. Only two of the N low quality images are indicated by broken lines for simplicity. Images indicated by trapezoids indicate images after the projective transformation.

Next, in S409, a convolution operation unit included in the feature transformation unit 1002 performs a convolution operation on the image $I^{(j)}$ to obtain a feature $f_1^{(j)}$ of the NN. Next, in S411, the feature integration unit 1003 obtains a distance map D* from the subject distance acquisition unit 1007. In terms of the distance map, it is assumed that the value of a distance of each pixel is obtained separately by any means such as an active pattern irradiation method at the same time as image capture. The realization means of the subject distance acquisition unit 1007 does not matter here.

Next, in S412, the feature integration unit 1003 selects one of M types of features $f_1^{(1)}$ (x, y) for each pixel on the basis of a value $d^*(x, y) \in D^*$ of the distance map, and obtains a feature $f_2(x, y)$. A more specific description is given. The feature $f_1^{(j)}(x, y)$ corresponding to the distance $d_j$ closest to $d^*(x, y)$ is set as a feature of $f_2(x, y)$. When expressed mathematically, it is as follows:

$$f_2(x,y)=f_1^{(j^*)}(x,y),$$

$$j^*=\mathrm{argmin}_j|d^*(x,y)-d_j|$$

Next, in S413, the image quality improvement transformation unit 1004 performs a convolution operation on the feature $f_2$, and generates a high quality image. Lastly, in S414, the image output unit 1005 outputs the generated image. The image output unit 1005 then ends the processes of flowcharts of FIGS. 15A and 15B. The information processing of the image processing apparatus 10 of the embodiment has been described up to this point.

In the embodiment, a deconvolution operation is not used unlike the first and second embodiments. This is because the purpose of the embodiment is not to improve the resolution of an image but to obtain an aesthetically pleasing high quality image such as captured with a large aperture lens.

Figure 14B:
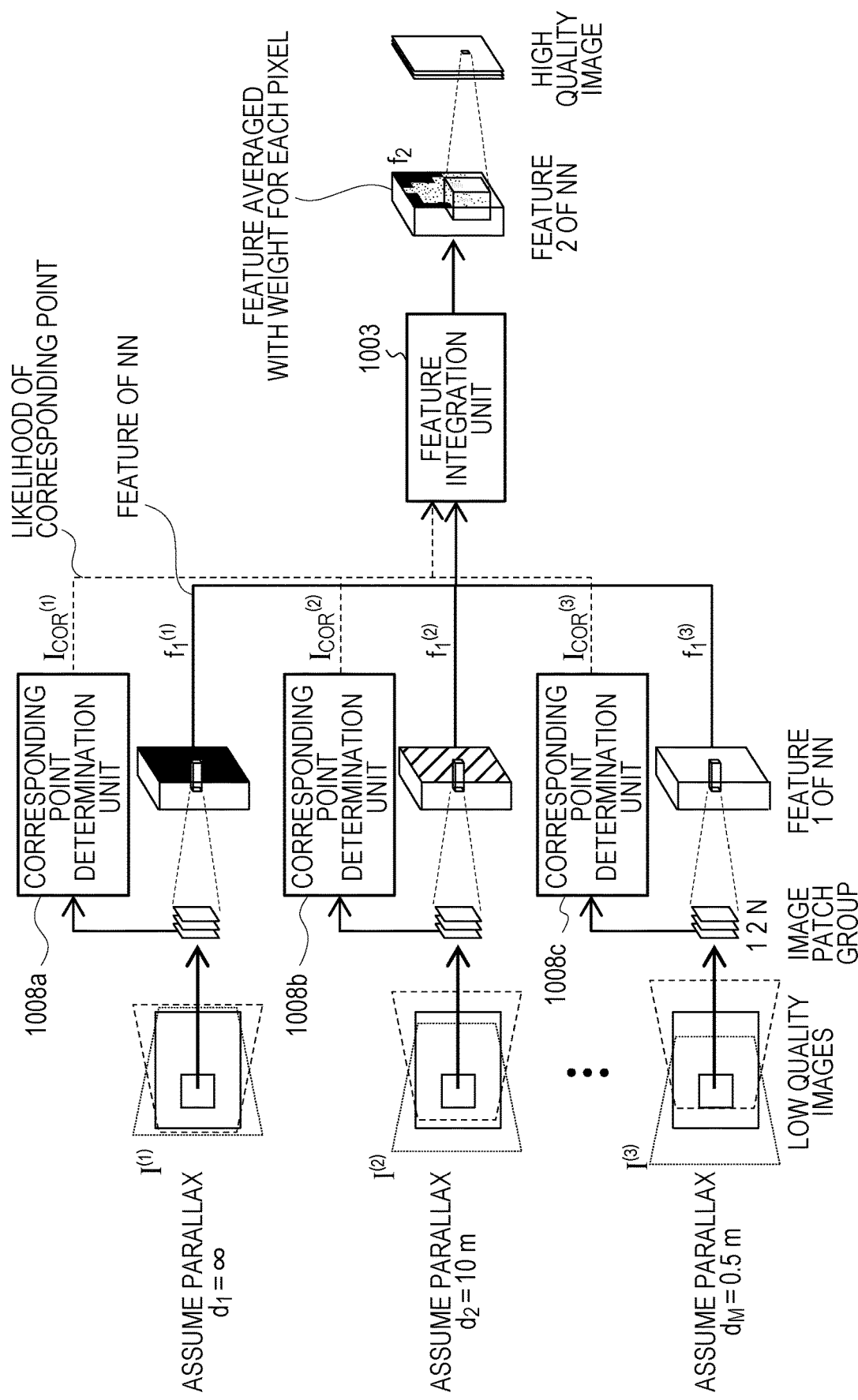
Figure 15C:
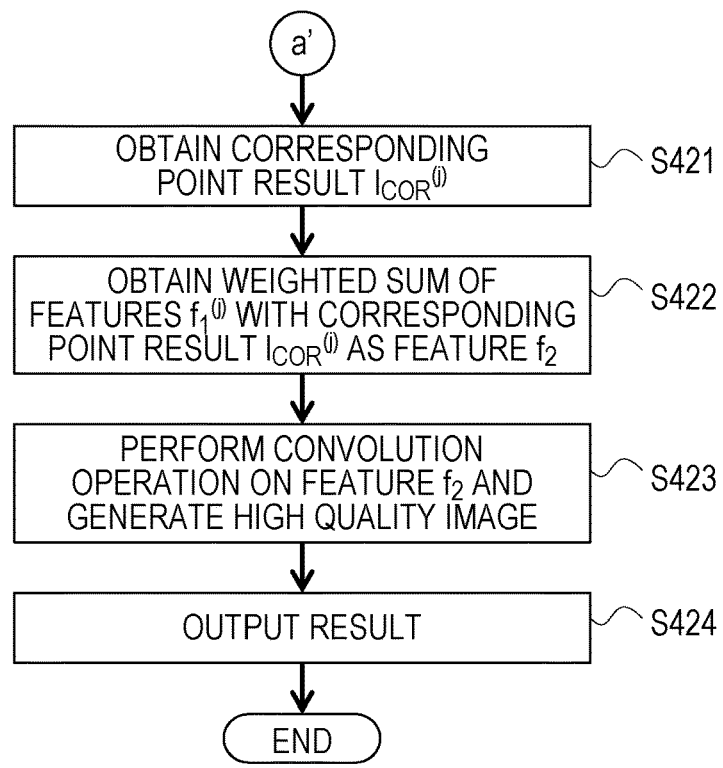

In the embodiment, the distance to a subject is obtained on a pixel by pixel basis. However, it is generally difficult to accurately measure the distance to a subject. Hence, a mode that does not require the estimation of the distance to a subject is disclosed next as a modification. FIG. 13B illustrates the functional configuration diagram of the modification of the embodiment. FIG. 14B illustrates a schematic diagram. Moreover, FIG. 15C illustrates the information processing of the modification. The image processing apparatus 10 of the modification includes a corresponding point determination unit 1008 instead of the subject distance acquisition unit 1007. When the image processing apparatus 10 of the modification initiates its operation, feature transformations are performed on M different parallaxes. Up to this point the process is similar to the above. At the same time, in S421, the pattern corresponding point determination unit 1008 determines whether or not each pixel of a set $I^{(j)}$ of N images is a corresponding point in a predetermined distance, and outputs the result. The method for determining a corresponding point is described below. The corresponding point determination unit 1008 makes the above-mentioned determination according to assumed M distances $d_j$. When the likelihood of the determination result is obtained, the feature integration unit 1003 performs a weighted sum of the features $f_1$ of each pixel of the M patterns on the basis of the following equation for integration into one feature $f_2$, in S422.

$$f_2(x,y)=(1/Z)\Sigma_j l_{COR}^{(j)}(x,y)f_1^{(j)}(x,y), Z=\Sigma_j l_{COR}^{(j)}(x,y)$$

Here, $l_{COR}^{(j)}$ represents the likelihood of whether or not the same point of the subject at the distance $d_j$ is projected into the image set $I^{(j)}$.

The processes of S423 and S424 are similar to those of S413 and S414.

Figure 14C:
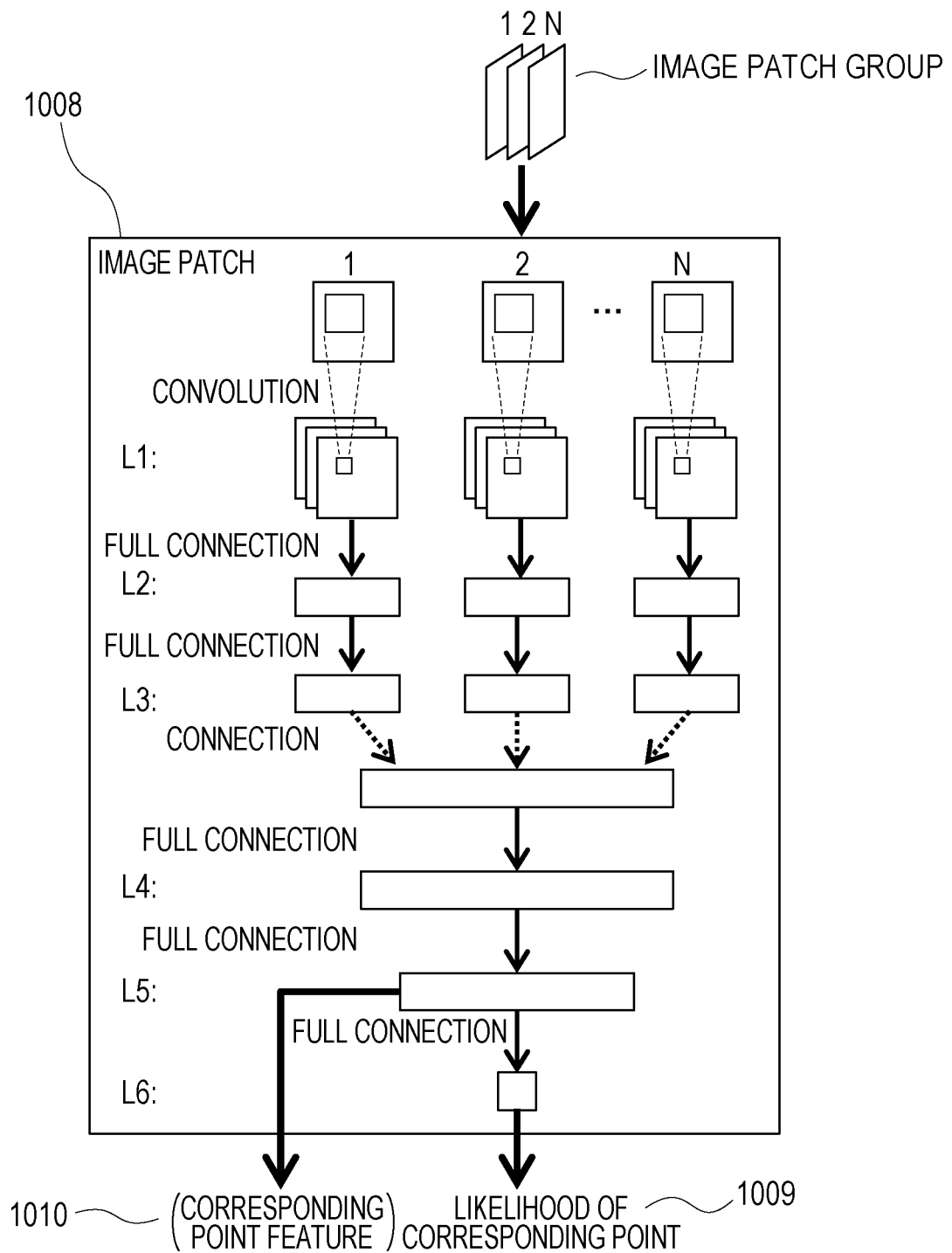

Next, the operation of the corresponding point determination unit 1008 that obtains $l_{COR}^{(j)}$ is described in detail. This is an extension of a method of J. Zbontar and Y. LeCun, Computing the Stereo Matching Cost with a Convolutional Neural Network. Proceedings of 28th IEEE Conference on Computer Vision and Pattern Recognition (CVPR), 2015 to a multi-view stereo mode. As illustrated in a schematic diagram of FIG. 14C, the corresponding point determination unit 1008 is an NN including a network of a convolution operation and full connections. The NN performs a transformation process on an input image patch group, and outputs a likelihood 1009 of a corresponding point of one variable as the final output. The likelihood 1009 of the corresponding point is a score obtained by determining whether or not the same position of the subject appears at the center of the image patch group. Weights of each layer of the NN are learned in advance, using case images for learning, to allow the appropriate output of the likelihood score.

Moreover, considering, here, that the determination of the likelihood of a corresponding point is not always successful, not the likelihood itself but the output of a previous layer (indicated by a symbol L5 in FIG. 14C) may be used as a feature. This is called a corresponding point feature 1010. In the case of the modification, the feature integration unit 1003 receives the corresponding point features 1010 of the M patterns and the features $f_1^{(j)}$ of the NN of the M patterns, connects them, and obtains a high-dimensional feature $f_2$. When the NN in the subsequent stage learns with the high-dimensional feature $f_2$ as an input, image quality can be improved without failure even in a case where the determination of a corresponding point fails.

Furthermore, some other modifications are described here. It is illustrated here that the mode of the third embodiment is applicable to various purposes.

Figure 16A:
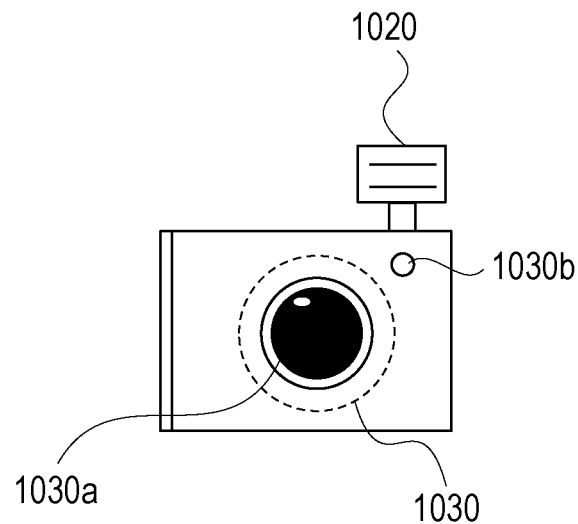
FIGS. 16A to 16F are diagrams illustrating examples of modifications of the third embodiment according to one or more aspects of the present disclosure.
Figure 16B:
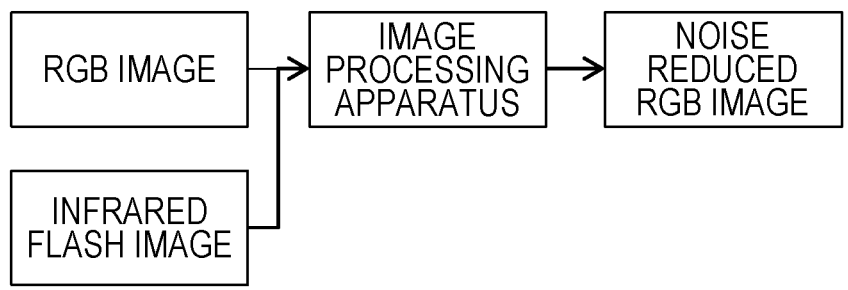

As another modification, the image processing apparatus 10 that uses an image capture unit with a configuration such as illustrated in FIG. 16A is disclosed. The purpose of the modification is similar to the paper of Qiong Yan et al. In other words, an infrared image is complementarily used to obtain a high quality color image where noise has been reduced. FIG. 16B illustrates a schematic diagram. The image capture unit of the embodiment includes an image capture device 1030a that captures an RGB image, an image capture device 1030b that captures an infrared image, and an infrared flash 1020. A virtual viewpoint position 1030 of a transformed high quality image is the same as a viewpoint position of the image capture device 1030a. It is assumed in the embodiment that an infrared flash is projected at the time of image capture, and the image capture device 1030a captures an RGB color image and the image capture device 1030b an infrared image at the same time. The images are used as low quality images. Furthermore, a high quality image for learning including the same subject is assumed to be an image with little noise obtained by being exposed by the image capture device 1030a to light for a long time. The operations of the following image quality improvement process and learning process are common to the third embodiment. Accordingly, the details are omitted. Up to this point it has been illustrated that the mode of the third embodiment can be applied to the image quality improvement process having another purpose. In addition, various modes can be employed.

Figure 16C:
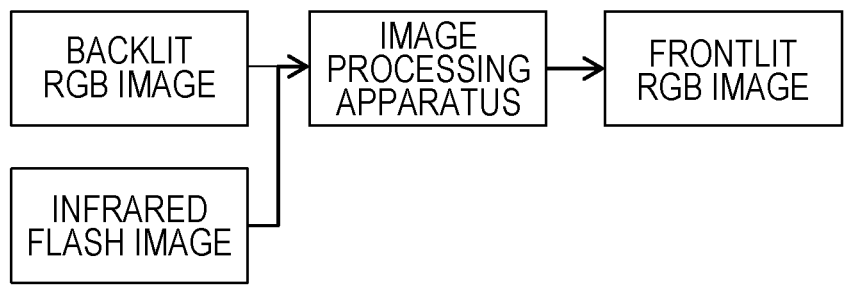

As still another modification, for example, a transformation may be performed in such a manner as to obtain an RGB color image such as captured frontlit, from an RGB color image of a person captured backlit, and an infrared image captured using the infrared flash as illustrated in a schematic diagram of FIG. 16C.

In terms of the low quality images, as long as they agree with the purpose of the image quality improvement, images of various attributes can be used as follows.

Figure 16D:
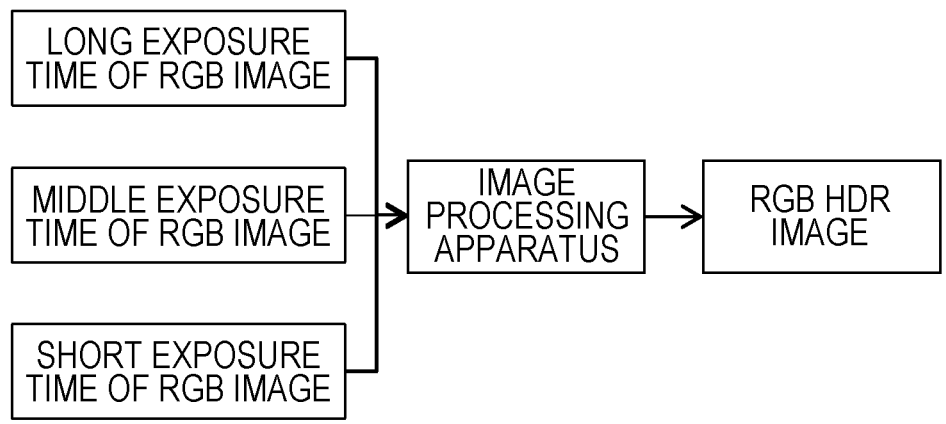

As still another modification, for example, an image with a wide dynamic range of brightness (an HDR image) may be generated from a group of low quality images captured by low quality image capture devices from a plurality of viewpoints, the group of low quality images having been exposed to light for different periods of time, as illustrated in a schematic diagram of FIG. 16D.

Figure 16E:
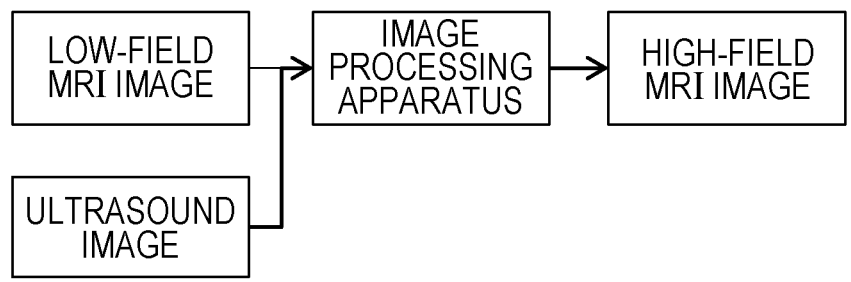

As still another modification, an image captured by a low-field MRI apparatus and an image of a different attribute, such as an ultrasound image or X-ray image, obtained by capturing the same subject are combined, as illustrated in a schematic diagram of FIG. 16E. Consequently, an image with definition as high as an image captured by a high-field MRI apparatus, or voxel data may be obtained. A combination of images is appropriately selected and accordingly a low invasive and high quality medical image can be obtained. Moreover, for example, the attribute of an image may be converted as in a case where a plurality of ultrasound images is used as inputs, and an X-ray image is used as a target image.

Figure 16F:
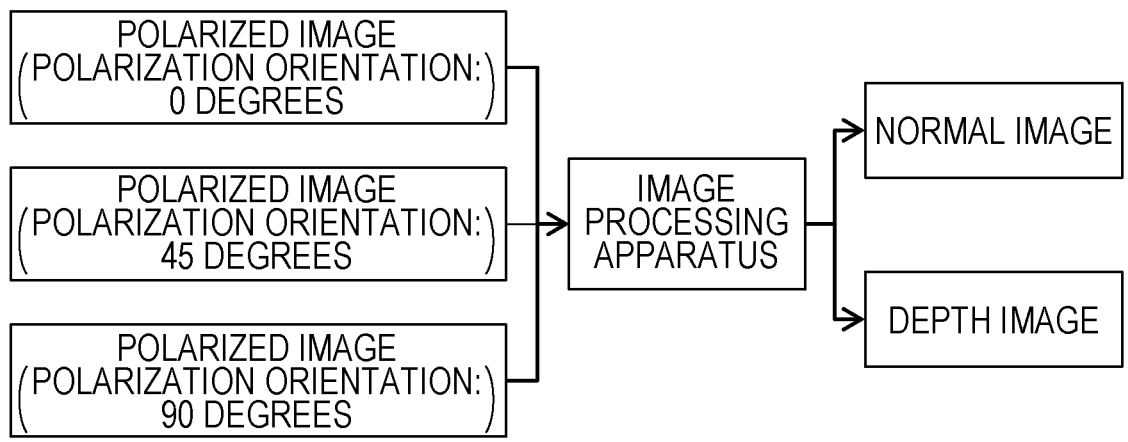

As still another modification, a plurality of results may be output at the same time. As illustrated in a schematic diagram of FIG. 16F, for example, a map in the direction of a normal to a surface of a subject, and a depth image (2.5-dimensional image) may be generated at the same time from a plurality of low quality image capture devices including a plurality of filters whose polarization directions are different. It may be configured in such a manner that when a plurality of transformations of different purposes is performed, as long as tasks are related, some layers of an NN are used in common up to some midpoint, and only a high layer of the NN for image generation is separately prepared for each task and learns. It is more advantageous in terms of scale than a preparation of two different NNs for the image processing apparatus 10.

As described above, in the embodiment, the mode has been described in which low quality images from different viewpoint positions are integrated to generate a high quality image. Furthermore, it has been illustrated as the mode of the feature integration unit 103 that a selection on a pixel by pixel basis and a weighted sum (weighted average) of each pixel are possible other than the connection of features illustrated in the first embodiment. In this manner, various modes are conceivable for the feature integration unit 103, and the feature integration unit 103 is not limited to a specific mode.

Fourth Embodiment

In this embodiment, a mode is described in which a connectivity relationship of an NN is determined on the basis of a geometric positional relationship of low quality image capture devices. The functional configuration diagram is the same as FIG. 13B used in the third embodiment. However, the embodiment does not require the corresponding point determination unit 1008 unlike the third embodiment.

Figure 17A:
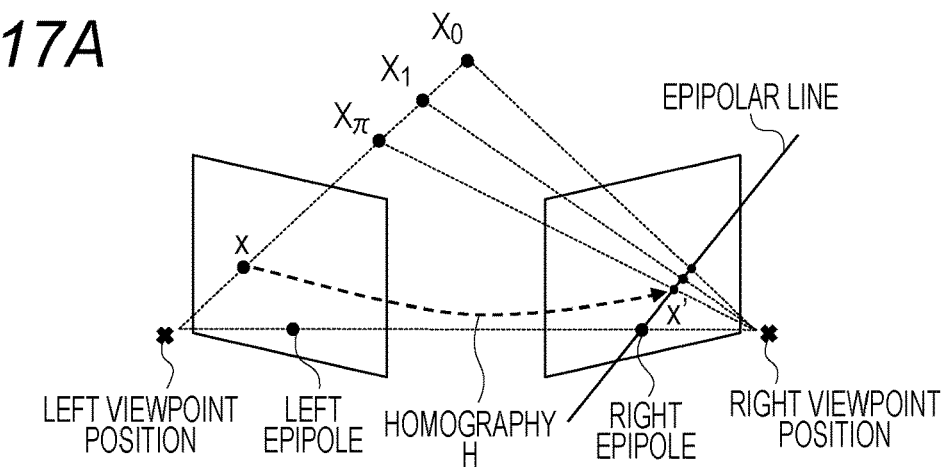
FIGS. 17A to 17C are diagrams for explaining an epipolar constraint according to one or more aspects of the present disclosure.
Figure 17B:
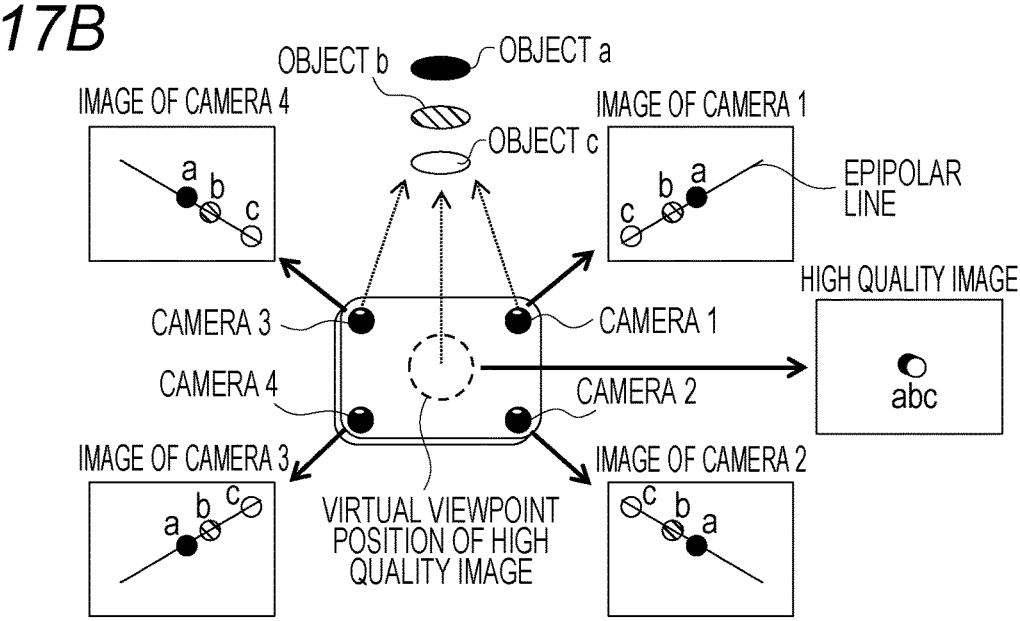

There is a geometric relationship called an epipolar constraint illustrated in FIG. 17A between images from a plurality of viewpoints. On this precondition, information processing and the like of the embodiment are described. An image capture unit of the image processing apparatus 10 of the embodiment includes four low quality image capture devices (cameras 1 to 4) whose optical axes are parallel as illustrated in FIG. 17B. FIG. 17B illustrates a virtual viewpoint position of a high quality image in the form of a broken line circle.

Figure 17C:
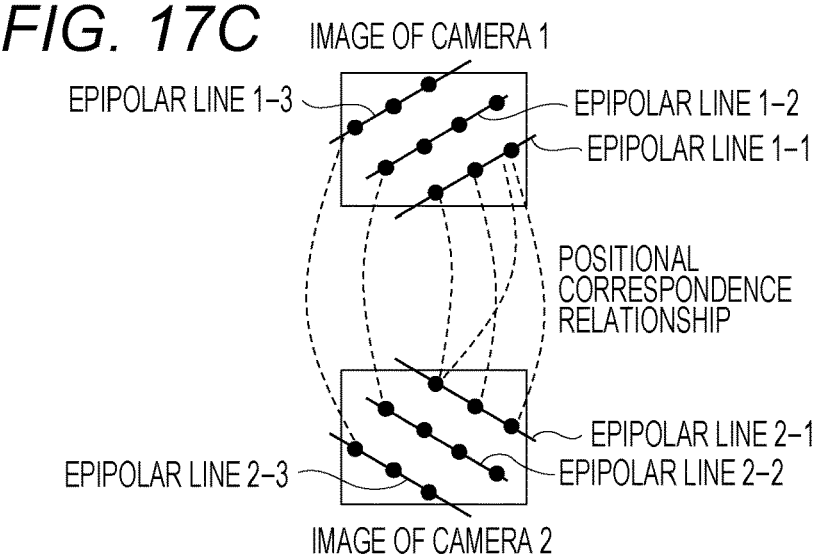

It is assumed here that objects a to c being subjects are arranged in front of the image capture unit. At this point in time, the objects a to c in low quality images are arranged on a straight line due to an epipolar constraint as illustrated in FIG. 17B. With this geometric relationship, it can be seen that an area having a possibility that the same point appears between the low quality images lies only on an epipolar line. More specifically, as illustrated in FIG. 17C, a possible area having a correspondence relationship with an area on an epipolar line 1-1 in an image of the camera 1 is limited to any area on an epipolar line 2-1 in an image of the camera 2. FIG. 17C illustrates only part of the correspondence relationships with broken lines.

In the image processing apparatus 10 of the embodiment, the connectivity relationship of each layer of the NN is designed as follows, using the correspondence relationships between image areas: As illustrated in FIG. 18A, it is assumed that there are N=4 low quality images. For simplicity of description, the low quality images and the high quality image are assumed to be luminance images having one channel. A layer 1800 of neurons, which is a first layer, has one neuron for each pixel x, y of a target high quality image I*(x, y). Each neuron has N feature channels. This is expressed in a symbol $f_1(x, y) \in R^N$. Furthermore, M such neuron layers are prepared corresponding to M parallaxes (depths). The feature of a neuron is expressed in a symbol $f_1^{(j)}(x, y) \in R^N$ with j as a parallax number.

The connectivity relationship between a pixel (x', y') of each low quality image and a neuron (x, y) is set. FIG. 18A illustrates a more specific example. In terms of a small parallax (j=1), a pixel 1801 of the image of the camera 1 and a pixel 1802 of the image of the camera 2 correspond to a pixel 1805 at the center of a feature $f_1^{(1)}(x, y)$. In terms of a large parallax with j=M, a pixel 1803 of the image of the camera 1 and a pixel 1804 of the image of the camera 2 correspond to a pixel 1806 at the center of a feature $f_1^{(M)}(x, y)$. The value of a pixel of the i-th image is assumed to be input into the i-th channel of each neuron. The weight of a connection of input is assumed to be one, that is, an identity function.

As described above, the input relationship between each neuron and an image can be uniquely determined by an epipolar constraint and parallax. However, a homography matrix is obtained as described below to accurately obtain a correspondence relationship in reality. Assuming a point Xπ and a plane π passing the point Xπ as illustrated in FIG. 17A, the homography matrix is a 3×3 transformation matrix where a position x when viewing the point Xπ on the plane π from one image projects into the other image, on a position x'. A homography matrix H is given by the following equation.

$$x = H_1 X\pi,$$

$$x' = H_2 X\pi$$

$$x' = H_2 X\pi = H_2 H_1^{-1} x = Hx$$

It is known that when four or more points corresponding between two images are obtained, the homography matrix H is obtained. Hence, calibration boards or the like are presented vertically to the optical axis at positions of parallaxes 1 to M. Four or more corresponding points between the images are extracted to obtain the matrix H between the images. As a result, a connectivity relationship of the NN that associates each pixel of the low quality images from the plurality of viewpoints with each pixel of features $f_1^{(1)}$ to $f_1^{(M)}$ of the M parallaxes.

When the image processing apparatus 10 of the embodiment initiates its operation, N low quality images are acquired. The feature transformation units 1 to M transform the N low quality images into the features $f_1^{(1)}$ to $f_1^{(M)}$ of the NN. Furthermore, the feature transformation units 1 to M perform a convolution operation on the features $f_1^{(1)}$ to $f_1^{(M)}$ to obtain features $f_2^{(1)}$ to $f_2^{(M)}$ of the NN. $f_2^{(1)}$ to $f_2^{(M)}$ are features that represent what kind of appearance pattern such as an edge and texture is present at each position when the space is divided into M levels from near to far.

Furthermore, the feature integration unit 1003 of FIG. 13B connects the features $f_2^{(1)}$ to $f_2^{(M)}$ to obtain a feature $f_3$. The image quality improvement transformation unit 1004 performs a convolution on the feature $f_3$ to generate a high quality image I*. In an image quality improvement transformation, a process of integrating high-dimensional features divided at near and far positions and associating the feature with a local area of a high quality image to perform a transformation is performed. The learning method of transformation parameters in each layer is similar to the above.

Figure 18B:
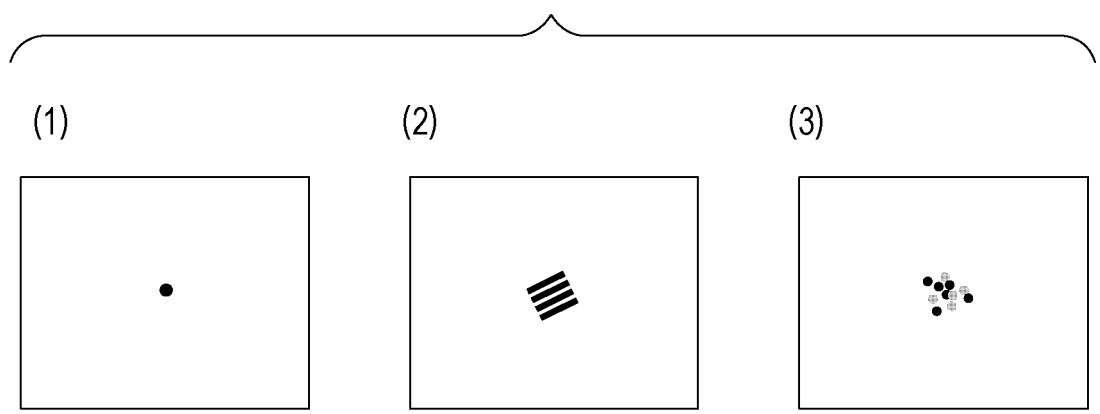

As described above, the connectivity relationship between a low quality image and a first layer of the NN is determined on the basis of a geometric constraint condition between images. On the other hand, such a connectivity relationship may be acquired automatically. One example is cited below. (1) Firstly, the image processing apparatus 10 prepares fully connected weights between all pixels of an input image and neurons in the first layer of the NN to initialize them with random numbers. (2) The image processing apparatus 10 presents calibration patterns whose examples are illustrated in FIG. 18B in various positions, and learns the weights by the backpropagation method in such a manner that the same patterns can be generated in the first layer of the NN. As the calibration patterns, those including patterns of a luminous point only near the center, a grid in a specific direction, and random dots are suitable to facilitate learning of the connectivity relationship, as illustrated in FIG. 18B. (3) The image processing apparatus 10 advances learning, removes the weight that has approached zero assuming that the weight is irrelevant to a corresponding point, and employs the remaining connections. At the time of learning, the first layer 1800 of the NN is learned individually according to the parallax. At this point in time, a calibration pattern captured with a corresponding parallax is provided as a learning image. The mechanism for automatically acquiring the connectivity relationship between each pixel and the first layer of the NN has been described above. In the case of this method, there is an advantage in being able to input a captured image as it is without pre-processing of distortion correction.

Moreover, as still another modification, after acquiring the above connectivity relationship of the NN, the image processing apparatus 10 may further adjust weights in all the layers from the final output layer to the input layer by the backpropagation method on the basis of learning images. In this manner, the information processing of the image processing apparatus 10 of the embodiment indicates to determine the connectivity relationship of an NN from a geometric positional relationship of image capture devices, and to learn the weight of each connection with case images.

Fifth Embodiment

Figure 19A:
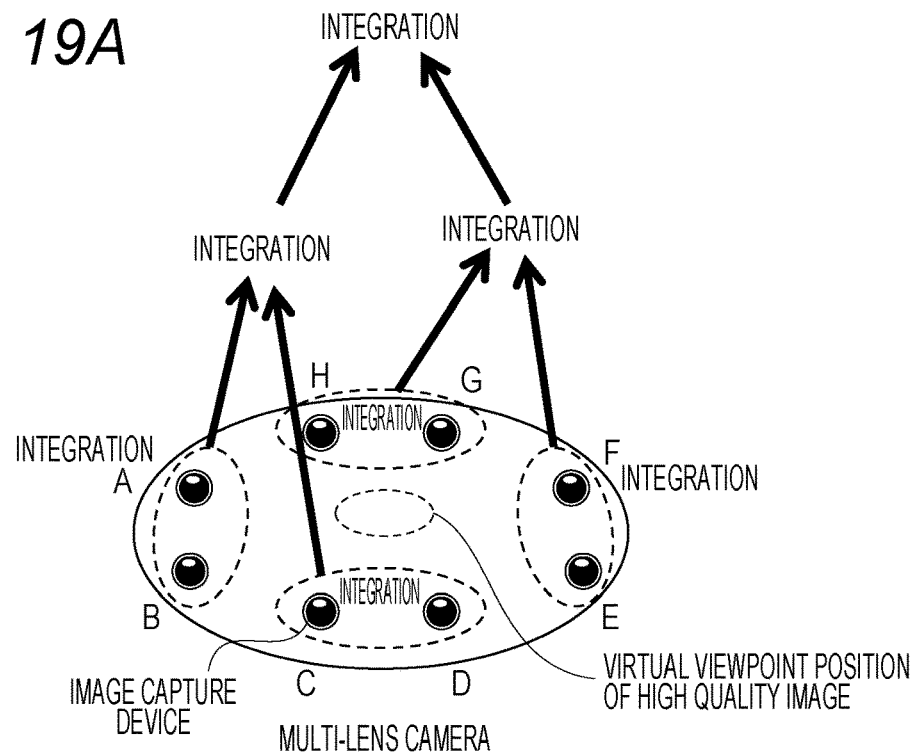
FIGS. 19A and 19B are schematic diagrams of neural networks according to one or more aspects of the present disclosure.
Figure 19B:
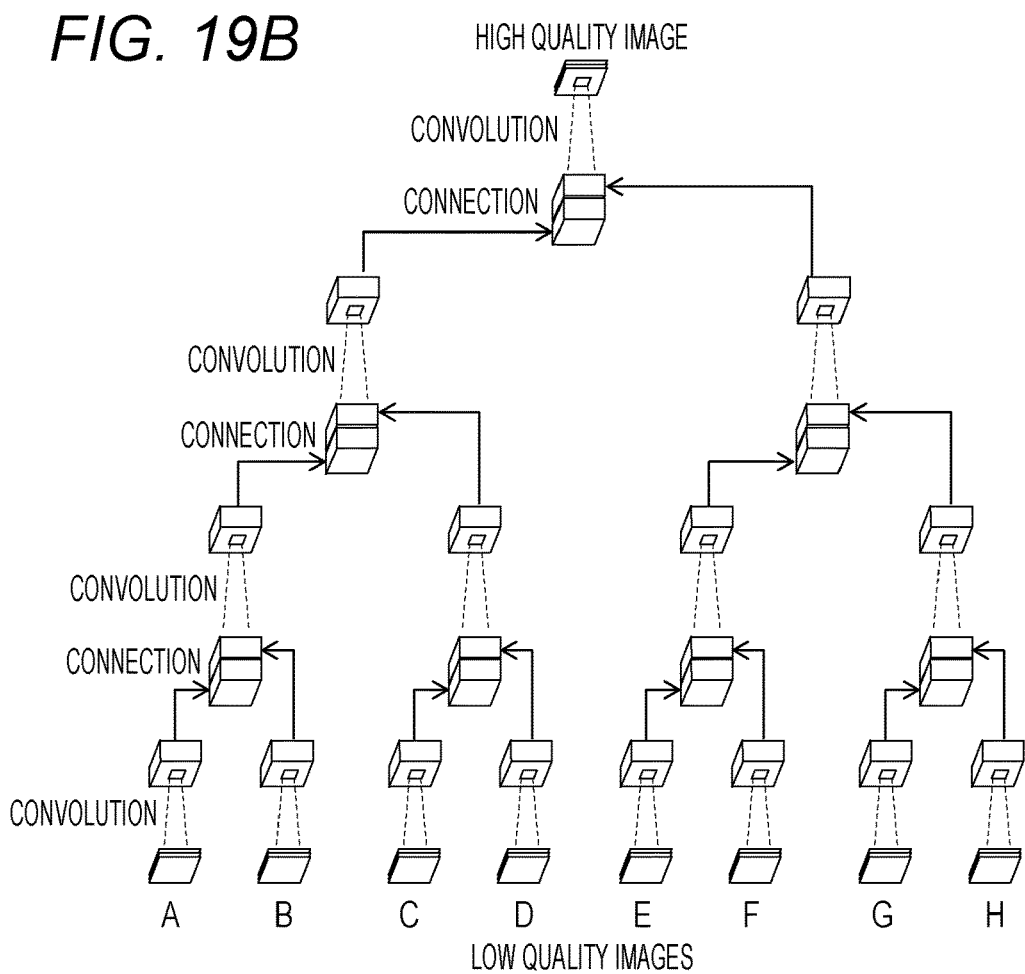

In a fifth embodiment, a description is given of a mode in which images acquired from multiple low quality image capture devices are integrated in stages. The purpose of the image processing apparatus 10 is to improve image quality as in the third embodiment. A wide selection of targets for improvement in image quality are applicable here as in the third embodiment. An image processing apparatus of the embodiment has an appearance of an image capture unit of a multi-lens camera such as illustrated in FIG. 19A. FIG. 19B is a schematic diagram of an image quality improvement process corresponding to the image capture unit. The image processing apparatus 10 integrates features sequentially from low quality images captured by low quality image capture devices whose viewpoint positions are close to each other, among low quality image capture devices to which symbols A to H are assigned in FIG. 19A. The image processing apparatus 10 divides such integration into three stages, repeats the integration, and obtains a final transformation result of a high quality image, as illustrated in FIG. 19B. The advantage in sequential integration starting with image capture systems close to each other as in the embodiment is a point that a displacement between images due to parallax is small in each integration stage. Hence, it is possible to easily absorb the displacement of an appearance resulting from parallax by a feature transformation by a convolution operation and the like, and perform integration.

In terms of learning in the embodiment, as in the previous learning, a high quality image captured from a virtual viewpoint position is provided as a target image, and transformation parameters in all the stages are learned in such a manner as to generate the target image from low quality images. This is simply required to learn while propagating an error through all the three layers from the final layer to the first layer by the backpropagation method.

Figure 20A:
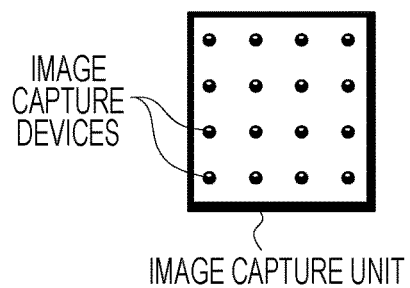
FIGS. 20A to 20D are diagrams illustrating examples of application to a multi-camera array according to one or more aspects of the present disclosure.
Figure 20C:
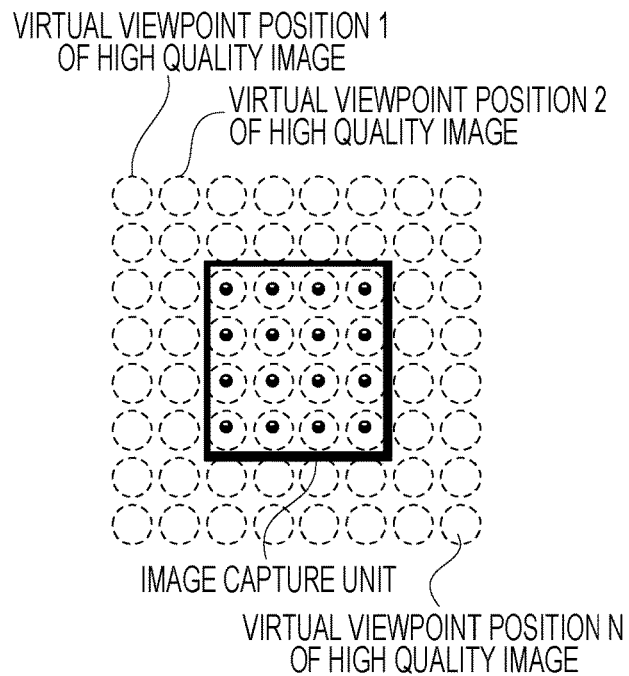
Figure 20B:
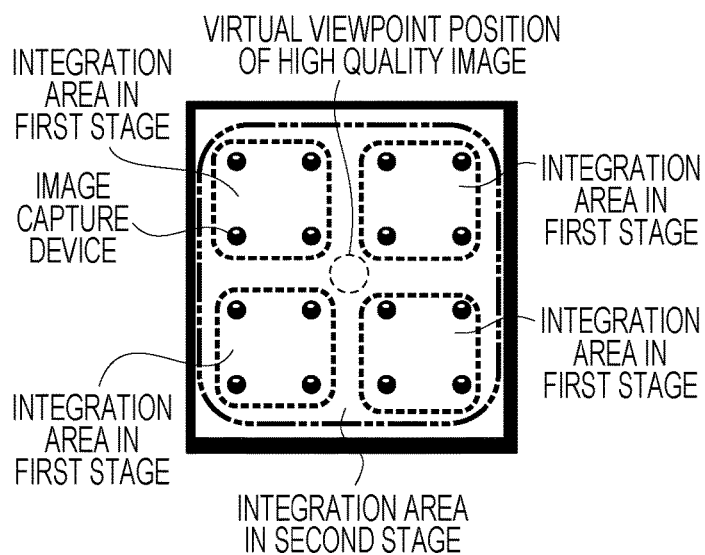

As a modification of the embodiment, a description is given of a mode in which integration is performed in stages on images of an image capture device array as in FIG. 20A. In the embodiment, the image processing apparatus 10 integrates images acquired by each group of 2×2 neighboring image capture devices first as the first integration stage as illustrated in FIG. 20B. The image processing apparatus 10 obtains four integrated features as a result of the integration process in the first stage, further connects the four features in the second stage of the integration process to obtain one feature, and generates a high quality image.

Furthermore, a description is given of a second derivative mode of stepwise integration of images of the image capture device array. A mode in which learning and stacking is performed in stages illustrated here. A description is given below using schematic diagrams of FIGS. 21A and 21B.

The configuration of an NN equal to one stage for image integration is similar to the previous embodiments. As illustrated in FIG. 21B, the NN equal to one stage includes three layers of a feature transformation (a convolution operation 2101), integration (a connection process 2102), and image generation (a convolution operation 3000). The integration of images is performed on images of 2×2 low quality image capture devices in a neighboring area. Examples of the integration areas are illustrated in FIG. 21A, enclosed in a black frame and a gray frame as an integration area 1 and an integration area 2, respectively. The integration areas overlap with each other as in FIG. 21A. Transformation parameters of the NN are learned independently in each integration area.

FIG. 21B illustrates only one NN in each stage among the columnar NNs having three layers where integration is performed of an NN in each stage. However, in reality, 3×3, 2×2, and 1×1 columnar NNs having three layers are present respectively in the first, second, and third stages. The image processing apparatus 10 obtains 3×3 integrated features as a result of the integration in the first stage. The image processing apparatus 10 integrates the 3×3 features successively in the second and third stages, and obtains 2×2 features and 1×1 feature in the respective stages. The image processing apparatus 10 generates a high quality image in the end from the 1×1 integrated feature, and terminates the operation.

Moreover, still another modification is described here. What is described here is a modification in which a plurality of virtual viewpoint positions of high quality images can be set as illustrated in FIG. 20C. In this modification, a high quality image is captured at each preset viewpoint position. The transformation parameters of an NN are learned for each viewpoint and saved. At the time of image processing, a user is caused to input a virtual viewpoint position with a virtual viewpoint position input unit provided separately. A corresponding transformation parameter is read to perform the image quality improvement transformation process. The closer the virtual viewpoint position of a high quality image is to the center of a set of low quality images, the higher the accuracy of a transformation result is. However, the virtual viewpoint position can also be set outside the image capture unit as illustrated as a virtual viewpoint position 1 in FIG. 20C. Moreover, it may be a mode in which the virtual viewpoint position is not on the same plane of the image capture devices likewise.

Figure 20D:
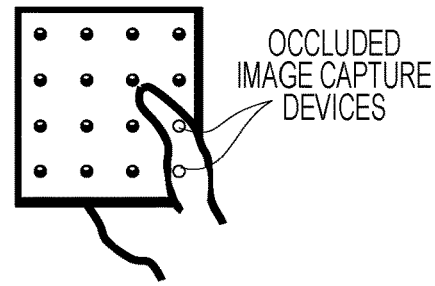
Figure 22:
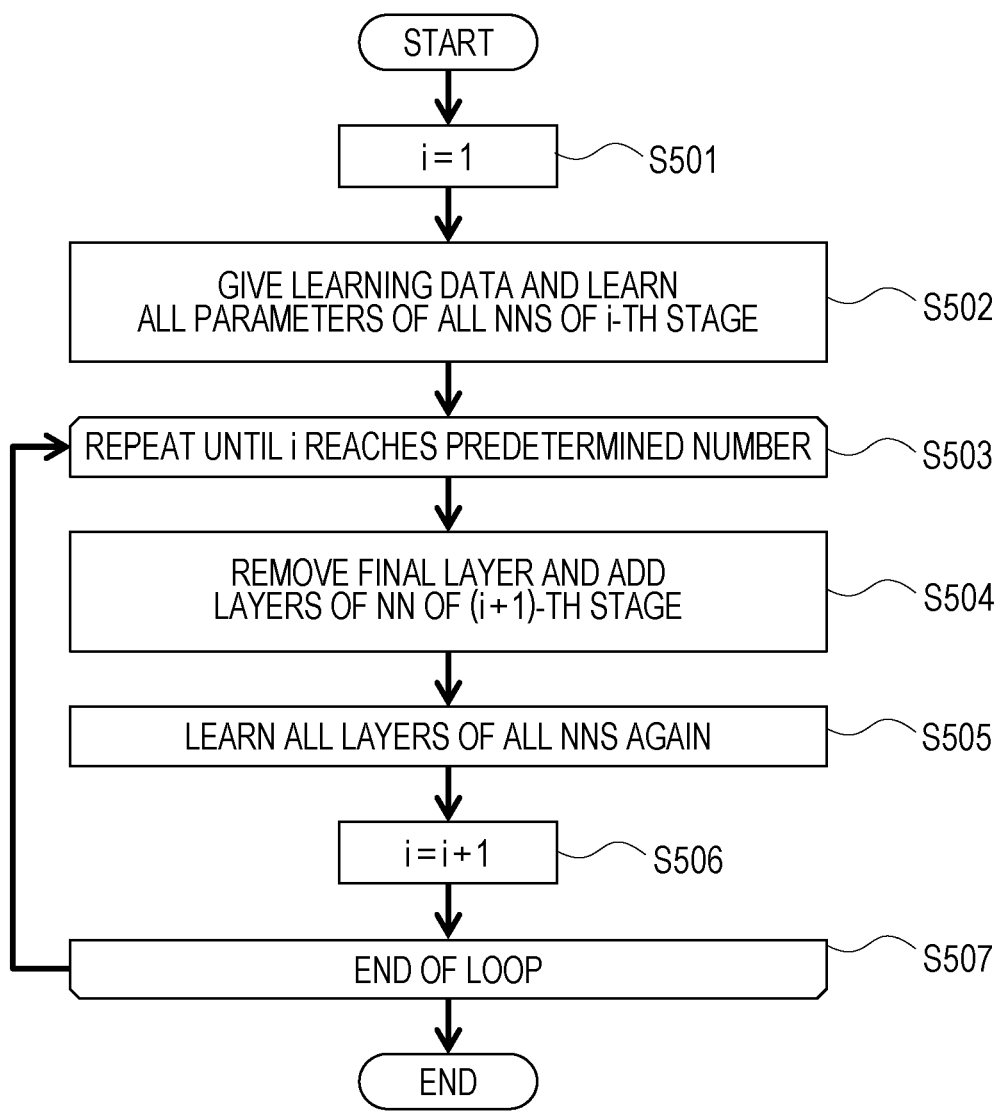
FIG. 22 is a flowchart illustrating an example of a process of learning in stages according to one or more aspects of the present disclosure.

Moreover, as still another modification, a configuration to which a measure against an occlusion upon imaging is added is disclosed. A manner for obtaining a high quality image robustly even in a situation where some cameras of an image capture device array are occluded by a finger of a photographer as illustrated in FIG. 20D is described here.

For example, as one of the modes, the image processing apparatus 10 separately includes an occluded image determination unit that makes a determination on whether or not an image is occluded. Upon integration by the feature integration unit 103, features of images determined to be occluded are removed for integration. Calculations for the integration of features at this point in time are assumed to be the operation of averaging values according to the dimension. Moreover, if the occluded image determination unit outputs the value of likelihood of occlusion, the feature integration unit 103 may integrate features not by averaging but by the weighted sum method as in the following equation.

$$f_{i+1}^{(k)}(x,y,d)=(1/\Sigma_{j\in N_k} l_{OCCi}^{(j)})\Sigma_{j\in N_k} l_{OCCi}^{(j)} f_i^{(j)}(x,y,d),$$
$$l_{OCCi+1}^{(k)}=\Sigma_{j\in N_k} l_{OCCi}^{(j)}$$

$f_i^{(j)}$ is the j-th feature in the i-th stage, $N_k$ is a set of features to be integrated into the k-th feature in each stage, and $l_{OCCi}^{(j)}$ is the likelihood of whether or not the image feature j is an occluded image.

As an embodiment of the occluded image determination unit here, for example, discrimination learning is performed by a discriminator such as a support vector machine, using features of NNs of each image. Alternatively, an averaged image obtained by averaging all captured images and each image may be compared with a normalization function to determine that an image having a low similarity to the averaged image is occluded.

Moreover, as still another modification, it may be configured in such a manner that the determination unit for an occluded state is not provided. For example, the image processing apparatus 10 captures multiple low quality images occluded by a finger of a photographer. The image processing apparatus 10 then learns given a sufficient amount of such case data. As a result, a transformation parameter is obtained which does not respond to a feature obtained from an occluded image but responds to a feature obtained from a non-occluded image, and performs a transformation in each stage.

Up to this point the embodiment in which images acquired by image capture devices are integrated in stages in the image processing apparatus 10 of the embodiment including multiple low quality image capture devices has been described. The points illustrated in the embodiment are as follows: (1) The connectivity relationship of an NN is determined on the basis of an optical placement relationship of the low quality image capture devices, and (2) A transformation parameter of the determined connection is learned by case learning and adjusted. The above configuration is a novel configuration that does not included in a known image processing apparatus 10 for improvement in image quality.

Up to this point the preferred embodiments of the present disclosure have been described in detail. However, the present disclosure is not limited to such specific embodiments. For example, the whole or part of the functional configuration of the above-mentioned image processing apparatus 10 may be implemented as a hardware configuration on the image processing apparatus 10. Moreover, the above-mentioned embodiments and modifications of the embodiments may be combined as appropriate, and implemented.

As described above, according to the processes of the above-mentioned embodiments, features of abstract representations such as shape and texture are extracted from images. Moreover, image information from a plurality of viewpoints or of a plurality of attributes is integrated at a feature level, unlike the known methods. Furthermore, an image as a result of image quality improvement is estimated and synthesized from the integrated features, on the basis of the case learning method. As a result, there are the following effects as compared to the known methods: (1) A deformation and alignment is not required for causing a subject in an image to match substantially at the pixel level. (2) Images having different characteristics, such as an infrared image and a depth image, can be complementarily used. (3) Systematic noise that are difficult to be removed by image averaging can also be removed. (4) Not only resolution enhancement but also various types of image quality improvement processes can be achieved by preparing learning images adequate for the purpose and learning the cases.

Hence, a higher quality image can be obtained from a plurality of images.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-228042, filed Nov. 24, 2016, which is hereby incorporated by reference herein in its entirety.

What is claimed is:

1. An image processing apparatus comprising:
   one or more processors; and
   a memory coupled to the one or more processors, the memory having stored thereon instructions which, when executed by the one or more processors, cause the image processing apparatus to:
   acquire a plurality of images being obtained by capturing an identical target from different viewpoint positions by a plurality of image capturing devices;
   derive features from each of the plurality of images using corresponding one of first neural networks each provided for respective one of the viewpoint positions of the images;
   integrate the features derived from the plurality of images; and
   generate a high quality image of which quality is higher than that of each of the plurality of images, from the integrated features, using a second neural network.

2. The image processing apparatus according to claim 1, wherein integrating the features includes determining a connectivity relationship of individual neural networks on a basis of a geometric positional relationship between viewpoint positions of the plurality of images and a viewpoint position of the high quality image.

3. The image processing apparatus according to claim 1, wherein the one or more processors cause the image processing apparatus to integrate the features by determining a connectivity relationship of individual neural networks on a basis of case images for learning.

4. The image processing apparatus according to claim 1, wherein the one or more processors cause the image processing apparatus to integrate the features in a plurality of stages, and determines an order of integration of the features on a basis of proximity of the viewpoint positions of the images corresponding to the features.

5. An image processing method comprising:
   acquiring a plurality of images being obtained by capturing an identical target from different viewpoint positions by a plurality of image capturing devices;
   deriving features from each of the plurality of images using corresponding one of first neural networks each provided for respective one of the viewpoint positions of the images;
   integrating the features derived from the plurality of images; and
   generating a high quality image of which quality is higher than that of each of the plurality of images, from the integrated features, using a second neural network.

6. A non-transitory computer-readable storage medium storing a program causing a computer to execute a method of image processing, the method comprising:
   acquiring a plurality of images being obtained by capturing an identical target from different viewpoint positions by a plurality of image capturing devices;
   deriving features from each of the plurality of images using corresponding one of first neural networks each provided for respective one of the viewpoint positions of the images;
   integrating the features derived from the plurality of images; and
   generating a high quality image of which quality is higher than that of each of the plurality of images, from the integrated features, using a second neural network.

* * * * *